United States Patent
Mimura et al.

(10) Patent No.: US 7,332,213 B2
(45) Date of Patent: Feb. 19, 2008

(54) HARDCOAT FILM, ANTIREFLECTION FILM AND EQUIPMENT FOR DISPLAY

(75) Inventors: Takashi Mimura, Shiga (JP); Tatsuro Tsuchimoto, Shiga (JP); Satoshi Kojima, Kyoto (JP); Hisashi Minamiguchi, Shiga (JP); Minoru Yoshida, Shiga (JP)

(73) Assignee: Toray Industries, Inc., Tokyo (JP)

( * ) Notice: Subject to any disclaimer, the term of this patent is extended or adjusted under 35 U.S.C. 154(b) by 562 days.

(21) Appl. No.: 10/879,595

(22) Filed: Jun. 30, 2004

(65) Prior Publication Data

US 2005/0008863 A1 Jan. 13, 2005

(30) Foreign Application Priority Data

| Jun. 30, 2003 | (JP) | 2003-186692 |
| Jul. 9, 2003 | (JP) | 2003-194157 |
| Jun. 7, 2004 | (JP) | 2004-168331 |

(51) Int. Cl.
- *B32B 7/02* (2006.01)
- *B32B 3/00* (2006.01)
- *B32B 7/14* (2006.01)

(52) U.S. Cl. .............. 428/212; 428/201; 428/141; 428/409; 428/423.7; 428/424.4; 428/480; 428/520; 428/522

(58) Field of Classification Search ......... 428/212, 428/201, 141, 409, 423.7, 424.4, 480, 520, 428/522
See application file for complete search history.

(56) References Cited

U.S. PATENT DOCUMENTS

| 3,931,117 | A * | 1/1976 | Leonard ............. 528/45 |
| 4,609,267 | A | 9/1986 | Deguchi et al. |
| 4,691,045 | A * | 9/1987 | Fukuchi et al. ............. 560/185 |
| 4,812,523 | A * | 3/1989 | Toman ............. 525/162 |
| 5,015,523 | A | 5/1991 | Kawashima et al. |
| 5,709,950 | A * | 1/1998 | Burgman et al. ........ 428/423.1 |
| 5,763,096 | A * | 6/1998 | Takahashi et al. ......... 428/480 |
| 5,783,049 | A * | 7/1998 | Bright et al. ......... 204/192.14 |
| 5,834,398 | A * | 11/1998 | Mochizuki et al. ......... 503/227 |
| 5,990,984 | A | 11/1999 | Meredith, Jr. et al. |
| 6,489,015 | B1 * | 12/2002 | Tsuchiya et al. ........... 428/212 |
| 6,777,070 | B1 * | 8/2004 | Murata et al. ............ 428/323 |
| 6,828,010 | B2 * | 12/2004 | Kubota et al. ............ 428/213 |
| 2003/0120008 | A1 | 6/2003 | Obayashi et al. |
| 2004/0012317 | A1 | 1/2004 | Obayashi et al. |

FOREIGN PATENT DOCUMENTS

| CN | 1140131 A | 1/1997 |
| EP | 0731130 A1 | 9/1996 |
| EP | 1380857 A1 | 1/2004 |
| EP | 1447433 A1 | 8/2004 |
| JP | 02-008030 | 1/1990 |
| JP | 4-355401 | 12/1992 |
| JP | 08-197670 | 8/1996 |
| JP | 11-174971 | 7/1999 |

(Continued)

*Primary Examiner*—Milton I. Cano
*Assistant Examiner*—David J. Joy
(74) *Attorney, Agent, or Firm*—Darby & Darby, P.C.

(57) ABSTRACT

A hardcoat film comprises a substrate film, and a hardcoat layer laminated on at least one side of the substrate film, wherein a reflectance of the hardcoat layer at a wavelength within 400 to 600 nm has a mean ripple amplitude of 1% or less. The hardcoat film has decreased iris patterns. There is also provided an antireflection film having a low surface reflectance and a neutral tone of color, and an equipment for display including the film.

16 Claims, 5 Drawing Sheets

FOREIGN PATENT DOCUMENTS

| | | |
|---|---|---|
| JP | 2001-167367 | 6/2001 |
| JP | 2001-233611 | 8/2001 |
| JP | 2001-301095 | 10/2001 |
| JP | 2002-241527 | 8/2002 |
| JP | 2003-201443 | 7/2003 |
| JP | 2003-205563 | 7/2003 |
| WO | WO 00/22461 A1 * | 4/2000 |
| WO | WO 02/74538 A1 * | 9/2002 |

* cited by examiner

HARDCOAT FILM, ANTIREFLECTION FILM AND EQUIPMENT FOR DISPLAY

BACKGROUND OF THE INVENTION

1. Field of the Invention

The present invention relates to a hardcoat film, an antireflection film, and an equipment for display. More particularly, the present invention relates to a hardcoat film and an antireflection film for use on the surface of a display screen and a polarizer as well as to an equipment for display including the antireflection film.

2. Description of the Related Art

Plastic films such as polyester films have excellent mechanical properties, dimensional stability, heat resistance, transparency, and electrical insulating properties. They are widely used as substrates for many applications including magnetic recording materials, packaging materials, electrical insulating materials, photographic materials, graphic art materials and optical display materials.

However, plastic films generally have low surface hardness and insufficient abrasion resistance. Therefore, the surfaces such plastic films are easily damaged by friction or scratching due to contact with other stiff materials. The damage generated on the surface may significantly decrease the commercial value of the film, or make the film unusable for a shortened period.

In order to solve this problem, a hardcoat layer having excellent scratch resistance and abrasion resistance is disposed on the substrate film comprising polyester.

The hardcoat layer has a different refractive index from that of a polyester substrate or primer layer, and a distinct interface caused by the difference in the refractive indices exists between the hardcoat layer and the substrate or the primer layer. The film has a decreased clear view property, i.e., glittering or partly iris-like reflection is generated when the film is viewed at an angle. In order to avoid this phenomenon, various countermeasures have been taken. For example, Japanese Unexamined Patent Application Publication No. 2002-241527 discloses that a difference in refractive indices is decreased by improving the coating thickness accuracy and increasing the refractive index of the hardcoat layer. Japanese Unexamined Patent Application Publication No. 8-197670 discloses that a surface of a substrate film is roughened by embossing using a thermal press method and a hardcoat layer is laminated thereon. Japanese Unexamined Patent Application Publication No. 2003-205563 discloses that a solution for dissolving a substrate film is used for a hardcoat to dissolve or swell the substrate, thereby decreasing the interference fringe.

A conventional antireflection film including a hardcoat film is used as a display for a television display and a computer monitor. External light such as sunlight and fluorescent light are reflected and entered on/into the display to decrease a clear view property.

In order to prevent the light reflection, irregularities are provided on the surface of the display to diffuse the external light, or high and low refractive index thin films are alternately laminated on the display.

However, diffusion of the external light is insufficient for improving the clear view property, since images on the display are blurred.

Japanese Unexamined Patent Application Publication Nos. 4-355401 and 11-174971 discloses that a low refractive index layer is formed on a surface of a display to decrease the surface reflectance. However, the low refractive index layer is made of fluorine-containing resin, and therefore has insufficient surface hardness and scratch resistance. The surface is gradually scratched upon cleaning to decrease the clear view property.

Japanese Unexamined Patent Application Publication Nos. 2001-167637 and 2003-201443 disclose a low refractive index layer containing hollow particles for antireflection.

However, the reflectance is still not sufficiently decreased, interference iris pattern is produced, and scratch resistance of the surface does not satisfy the sufficient level.

SUMMARY OF THE INVENTION

An object of the present invention is to provide a hardcoat film having less iris pattern.

Another object of the present invention is to provide an antireflection film having low surface reflectance and neutral tone of color, and an equipment for display including the film.

Through intense studies by the present inventors, the aforementioned objects have been achieved. One aspect of the present invention is a hardcoat film comprising a substrate film, and a hardcoat layer laminated on at least one side of the substrate film, wherein the reflectance of the hardcoat layer at a wavelength within 400 to 600 nm has a mean ripple amplitude of 1% or less.

Another aspect of the present invention is an antireflection film comprising a substrate film, a hardcoat layer laminated on at least one side of the substrate film, a high refractive index layer laminated on the hardcoat layer, and a low refractive index layer laminated on the high refractive index layer, wherein the surface reflection spectrum of the antireflection film at a wavelength within 400 to 700 nm satisfies all the following three conditions: (1) a minimum reflectance of 0.6% or less, (2) a reflectance at a wavelength of 400 nm of 3.5% or less, and (3) a reflectance at a wavelength of 700 nm of 3% or less.

Still other aspect of the present invention is an equipment for display comprising the antireflection film which is adhered to a front side of a display panel or a transparent optical filter.

According to the present invention, the hardcoat layer is laminated on the substrate film and the reflectance of the hardcoat layer at a wavelength within 400 to 600 nm has a mean ripple amplitude of 1% or less, thereby providing the hardcoat film having the decreased iris pattern and an excellent clear view property. In the hardcoat film of the present invention, the hardcoat layer can be formed simultaneously with forming the substrate film. The hardcoat film can be produced with excellent productivity, and have excellent adhesion between the hardcoat layer and the substrate film. The antireflection film of the present invention has a low surface reflectance and a neutral tone of color, and is therefore suitable for use in a front face of a large flat display television such as a plasma display television, or a front face of a liquid crystal television.

DESCRIPTION OF THE PREFERRED EMBODIMENTS

The hardcoat film of the present invention comprises a hardcoat layer laminated on at least one side of a substrate film.

In the hardcoat film of the present invention, the reflectance of the hardcoat layer at a wavelength within 400 to 600 nm should have a mean ripple amplitude of 1% or less. The mean ripple amplitude is preferably 0.8% or less, and more preferably 0.5% or less.

If the mean ripple amplitude of the reflectance at the hardcoat layer is more than 1%, the iris pattern is produced and clear view property are decreased when light having a wavelength intensity distribution such as fluorescent light is reflected. If the mean ripple amplitude exceeds 1%, the adhesion between the hardcoat layer and the substrate is decreased.

Figure 1:
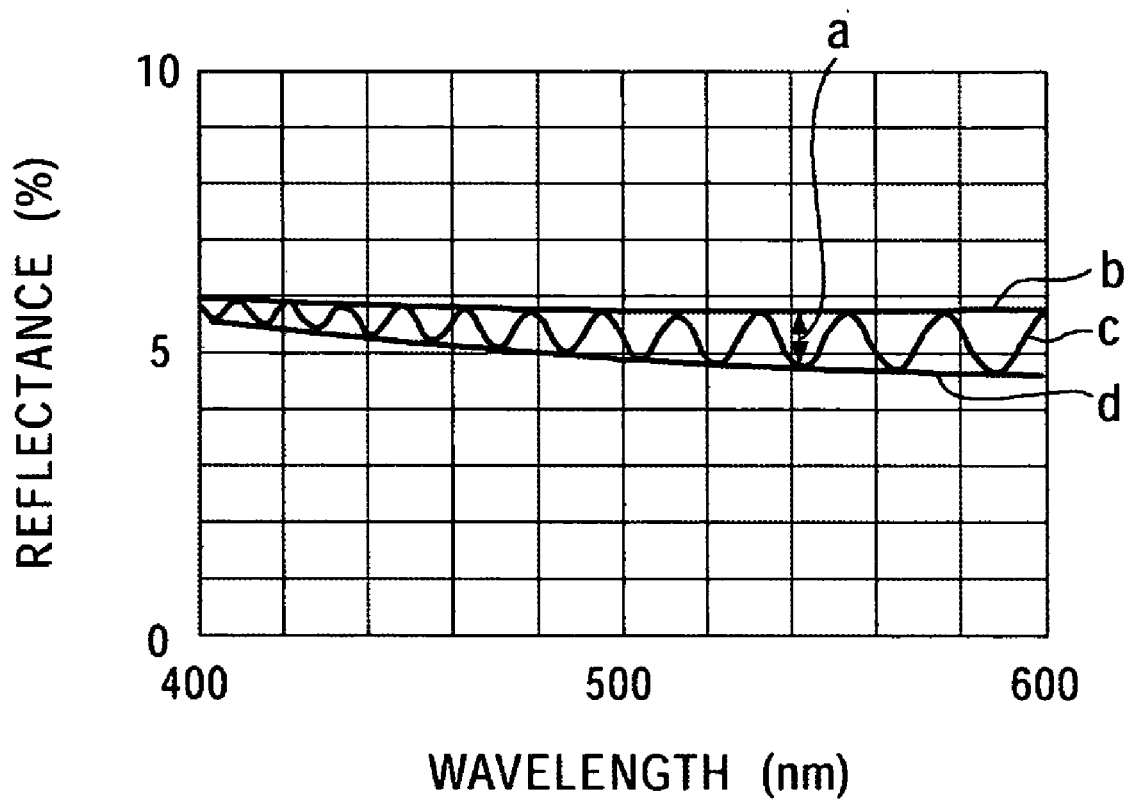
FIG. 1 is a graph showing ripple amplitudes of reflectances of wavelength versus reflectance.

According to the present invention, the mean ripple amplitude of the reflectance at a wavelength within 400 to 600 nm is measured as described below. The hardcoat layer laminated on the hardcoat film is used as a surface to be measured. An opposite surface is roughened using sandpaper or the like such that the gloss at 60° (JIS Z 8741) is 10 or less. Then, the roughened surface is colored in black to be a sample to be measured such that the mean transmittance of visible rays is 5% or less at a wavelength within 400 to 600 nm. The surface of the hardcoat film is measured using a spectrophotometer at an incidence angle of 10 degrees. FIG. 1 shows the results. In FIG. 1, curve (c) represents the relationship between the wavelength and measured reflectance. In the reflectance, there are ripples within a wavelength of 400 to 600 nm. In other words, the reflectance becomes high or low depending on the change in the wavelength. In terms of infinitesimal calculus, a ripple amplitude (a) is defined by the difference between a maximum value (a primary differential coefficient=0, a secondary differential coefficient<0) and a minimum value (a primary differential coefficient=0, a secondary differential coefficient>0). As shown in FIG. 1, a crest line (b) through crests (maximum values) in the ripple is drawn, and a root line (d) through roots (minimum values) in the ripple is drawn within the wavelength of 400 to 600 nm. The difference in values between the crest line (b) and the root line (d), i.e., the ripple amplitude (a), is determined at 11 sampling points at intervals of 20 nm within the wavelength of 400 to 600 nm. The sampling points are selected based on where the wavelength equals (400+20*i) nm, where i is an integer of 0 to 10. The average ripple amplitude is calculated by averaging the difference in values at 11 points. In the hardcoat film of the present invention, it is preferable that the mean ripple amplitude of the reflectance at the hardcoat layer measured within the wavelength of 600 to 740 nm be preferably 2% or less, and more preferably 1% or less, in order to decrease the iris pattern.

Preferably, the hardcoat film of the present invention has a surface reflectance of preferably 6% or less, and more preferably 5.5% or less. The lower the surface reflectance, the better the performance. If the surface reflectance is more than 6%, the clear view property may be decreased, and an unpleasant view may be provided, when the film is used for a nameplate or a touch panel, and sunlight and fluorescent light are entered the nameplate or the touch panel.

Preferably, the hardcoat film of the present invention has a haze of preferably 6% or less, more preferably 3% or less, and most preferably 1% or less. If the haze is more than 6%, transmitted images may be blurred, when the film is used for a nameplate or touch panel.

As the substrate film for use in the present invention, a film that can be formed in a fused state or in a solution is preferably used. Examples include a film made of polyester, polyolefin, polyamide, polyphenylene sulfide, acetate, polycarbonate or an acrylic resin. Especially preferred is a thermoplastic resin film, since it has excellent transparency, mechanical strength and dimensional stability. In equipment for display applications, it is preferable that light transmittance be high and the haze value be low. Therefore, a film is preferably made of at least one of polyester, acetate and an acrylic resin. In terms of transparency, the haze value and mechanical properties, a polyester film is especially preferable.

Preferably, the substrate film has a light transmittance of 40% or more, and more preferably 60% or more within the wavelength of 400 to 800 nm. Preferably, the substrate has a haze value of 5% or less, and more preferably 3% or less. When the substrate is used as an integral part of equipment for display and satisfies both conditions, excellent clearness can be provided. From a practical view point, the upper limit of light transmittance is about 99.5% and the lower limit of the haze value is about 0.1%.

Examples of polyesters suitable for use in the present invention include polyethylene terephthalate, polyethylene naphthalate, polypropylene terephthalate, polybutylene terephthalate and polypropylene naphthalate. These polyesters may be used in combination. The polyester may be copolymerized with other dicarboxylic acids or diols. The percentage of constituents in a polymerized product is selected such that crystallinity is preferably 25% or more, more preferably 30% or more, and most preferably 35 or more in the film after crystal orientation is completed. If the crystallinity is less than 25%, the dimensional stability and the mechanical strength may be insufficient. The crystallinity can be measured using Raman spectroscopic analysis.

Preferably, the above-mentioned polyester has, if used, a limiting viscosity of 0.4 to 1.2 dl/g, and more preferably 0.5 to 0.8 dl/g. The limiting viscosity is measured in o-chlorophenol at 25° C. in accordance with JIS K7367. If the limiting viscosity is less than 0.4 dl/g, the mechanical strength is insufficient. If the limiting viscosity exceeds this range, overquality is induced and the film-forming operation is deteriorated somewhat, which may be unfavorable from an economical view.

As the acetate, triacetyl cellulose is cited. As the acrylic resin, polymethyl methacrylate is cited.

The substrate film for use in the present invention may be a composite film including two or more laminated layers. For example, there are a composite film including an inner layer containing substantially no particles and a surface layer containing particles; a composite film including an inner layer containing coarse particles and a surface layer containing fine particles; and a composite film including an inner layer containing fine air bubbles. In the aforementioned composite films, the polymer constituting the inner and surface layers may be chemically different or the same.

According to the present invention, the substrate film including the hardcoat layer is preferably crystal-oriented by biaxial drawing to provide good thermal stability, dimensional stability, mechanical strength and flatness. As used herein, the phrase "the film is crystal-oriented by biaxial drawing" refers to the state in which a thermoplastic resin film that is not drawn, i.e., before crystal orientation is completed, is preferably drawn about 2.5 to 5 times in the longitudinal and width directions, and then crystal-oriented by heat treatment to show a biaxial drawing pattern with wide angle X-ray diffraction.

The thickness of the substrate film for use in the present invention is selected depending on the applications of the hardcoat film, as required. In view of the mechanical strength and handling properties, the thickness is preferably 10 to 500 µm, and more preferably 20 to 300 µm.

The substrate film for use in the present invention may contain various types of additives, resin compositions, and cross-linking agents as long as the advantages of the present invention are not inhibited. Examples include antioxidants, heat-resisting stabilizers, ultraviolet ray-absorbing agents, organic or inorganic particles, pigments, dyes, antistatic agents, nucleus formation agents, acrylic resins, polyester resins, urethane resins, polyolefin resins, polycarbonate resins, alkyd resins, epoxy resins, urea resins, phenol resins, silicone resins, rubber resins, waxes, melamine cross-linking agents, oxazoline cross-linking agents, methylol or alkylol urea cross-linking agents, acryl amide, polyamide, epoxy resins, isocyanate compounds, aziridine compounds, various silane-coupling agents, various titanate-coupling agents, and the like.

It is more preferable that inorganic particles be added to the polyester film, since the slidability and the scratch resistance are further improved. Examples of such inorganic particles include silica, colloidal silica, alumina, alumina sol, kaolin, talc, mica, calcium carbonate, barium sulfate, carbon black, zeolite, titanium oxide, metal fine particles, and the like. The inorganic particle preferably has an average particle size of 0.005 to 5 µm, and more preferably about 0.05 to 1 µm. The average particle size is measured using a laser diffraction particle size distribution measurement device, and refers to 50% particle size distribution, that is, the particle size at a distribution of 50%. Hereinafter, the average particle size refers to the 50% distribution particle size, unless otherwise specified. The inorganic particles are preferably added in an amount between 0.05 and 20 percent by weight, and more preferably 0.1 and 10 percent by weight based on 100 parts by weight of the substrate film.

In the hardcoat film of the present invention, the hardcoat layer is laminated on at least one surface of the substrate film. In the present invention, the hardcoat layer is stiffer than the substrate film. The hardcoat layer has a pencil hardness defined herein as 2H or more, and a steelwool hardness defined herein as 2 kg/cm$^2$ or more.

An adhesion-promoting layer is often disposed between the substrate film and the hardcoat layer in order to improve the adhesion. However, the adhesion-promoting layer easily induces an optical interference to increase the average ripple amplitude of the reflectance. Accordingly, in the hardcoat film of the present invention, it is preferable that the hardcoat layer is directly laminated on the substrate film.

The hardcoat layer can comprise acrylic resins, urethane resins, melamine resins, organic silicate compounds, silicone resins or metal oxides. The silicone resins and the acrylic resins are preferable in view of hardness and durability. Furthermore, acrylic resins, especially energy-cured acrylic resins, or thermosetting acrylic resins in view of curing properties, flexibility and productivity.

The energy-cured acrylic resin or the thermosetting acrylic resin is a composition containing a multi-functional acrylate, an acrylic oligomer or a reactive diluent as a polymerization-curing component. It may contain an optical initiator, a photosensitizer, a thermal polymerization initiator or a modifier, as required.

The acrylic oligomer is composed of an acrylic resin backbone to which a reactive acrylic group is connected, and includes polyester acrylate, urethane acrylate, epoxy acrylate and polyether acrylate. Also, a stiff backbone such as melamine or isocyanuric acid to which an acrylic group is connected may be used.

The reactive diluent serves as a solvent of a medium in a coating agent to be used in a coating step, contains a group that is reacted with a mono- or multi-functional acrylic oligomer, and can be a copolymerization component of the coating.

Specific but non-limiting examples of these acrylic oligomers, reactive diluents, photosensitizers, thermal polymerization initiators and cross-linking apparatuses are described, for example, in a Japanese language publication whose translated title reads "Cross-linking handbook" written by Shinzo Yamashita, Tosuke Kaneko, and published by Kabushiki Kaisha Taisei-sha, pp. 267-275, and pp. 562-593, in 1981.

Examples of commercially available multi-functional acrylic curing coating agents include the "Diabeam" (registered trademark) series manufactured by Mitsubishi Rayon Co., Ltd., the "Dinacol" (registered trademark) series manufactured by NAGASE & COMPANY, LTD., the "NK ester" (registered trademark) series manufactured by Shin-Nakamura Chemical Co., Ltd., the "UNIDIC" (registered trademark) series manufactured by Dainippon Ink & Chemicals, Incorporated, the "ARONIX" (registered trademark) series manufactured by Toagosei Co., Ltd., the "BLENMER" (registered trademark) series manufactured by NOF CORPORATION, the "KAYARAD" (registered trademark) manufactured by NIPPON KAYAKU Co., Ltd., the "LIGHT ESTER" (registered trademark) series and "LIGHT ACRYLATE" (registered trademark) series manufactured by Kyoeisha Chemical Co., Ltd. and the like.

A representative acrylic compound for forming the hardcoat layer includes as a main component a mixture containing at least one of a monomer and a prepolymer having three or more, preferably four or more, and most preferably five or more (meth)acryloyloxy groups in a molecule, and at least one monomer having 1 to 2 ethylenic unsaturated double bond(s) in a molecule. Such compound is preferably used in that the hardcoat layer provided by energy curing or thermosetting has excellent curing properties, abrasion resistance and flexibility. If the amount of the (meth)acryloyloxy group is too high, the monomer may have high viscosity, is not easily handled and has too high a molecular weight to be used as a coating liquid. Therefore, the number of (meth)acryloyloxy groups in a molecule is preferably 10 or less.

The term "(meth)acrylate", as used herein, encompasses acrylate and methacrylate.

The monomer and prepolymer having three or more (meth)acryloyloxy groups in a molecule is, for example, a (meth)acrylic acid ester compound provided by esterifying a polyhydric alcohol having three or more alcohol hydroxyl groups in a molecule.

Specific examples include pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, trimethylolpropane tri(meth)acrylate, pentaerythritol triacrylate hexamethylene diisocyanate urethane prepolymer, pentaerythritol triacrylate toluene diisocyanate urethane prepolymer, and pentaerythritol triacrylate isophorone diisocyanate urethane prepolymer. These monomers and the prepolymers can be used alone or in combination. Among them, a multi-functional acrylate compound having at least one hydroxyl group is especially preferable, since it can improve the adhesion between the hardcoat layer and the substrate film by combining it with isocyanate to be described later.

A monomer or prepolymer having three or more (meth)acryloyloxy groups in a molecule is preferably used in an amount of 20 to 90 percent by weight, more preferably 30 to 80 percent by weight, and most preferably 30 to 70 percent by weight based on the total amount of all components used to form the hardcoat layer.

If the monomer or prepolymer is used in an amount of less than 20 percent by weight, a cured coating having sufficient abrasion resistance may not be provided. If the monomer or prepolymer is used in an amount of more than 90 percent by weight, the cured coating is greatly compressed results in distortion, decreased flexibility, or great curling.

The multi-functional acrylate compound having at least one hydroxyl group is used in an amount of preferably 10 to 80 percent by weight, more preferably 20 to 70 percent by weight, and most preferably 30 to 60 percent by weight based on the total amount of all components used to form the hardcoat layer. If the amount of the multi-functional acrylate compound having at least one hydroxyl group is less than 10 percent by weight, the adhesion between the hardcoat layer and the substrate film is not satisfactorily improved. If the amount of the multi-functional acrylate compound having at least one hydroxyl group exceeds 80 percent by weight, the hardcoat layer tends to have a decreased cross-linking density, thus decreasing the hardness.

Herein, the percent by weight of the components used to form the hardcoat layer is calculated based on the resultant hardcoat layer after the curing reaction is completed. For example, the percent by weight of the monomer is calculated based on the residual on the resultant polymer. In other words, the solvent that is evaporated after the reaction is completed is not the components used to form the hardcoat layer.

Any monomers having 1 to 2 ethylenic unsaturated double bond(s) in a molecule can be used as long as they can be radically polymerized.

Examples of compounds having 2 ethylenic unsaturated double bonds in a molecule include the following (meth)acrylates (a) to (f):

(a) (meth)acrylic acid diesters of alkylene glycols having 2 to 12 carbon atoms such as ethylene glycol di(meth)acrylate, propylene glycol di(meth)acrylate, 1,4-butanediol di(meth)acrylate, neopentyl glycol di(meth)acrylate and 1,6-hexane diol di(meth)acrylate;

(b) (meth)acrylic acid diesters of polyoxy alkylene glycols such as diethylene glycol di(meth)acrylate, triethylene glycol di(meth)acrylate, tetraethylene glycol di(meth)acrylate, dipropylene glycol di(meth)acrylate, polyethylene glycol di(meth)acrylate and polypropylene glycol di(meth)acrylate;

(c) (meth)acrylic acid diesters of polyhydric alcohols such as pentaerythritol di(meth)acrylate;

(d) (meth)acrylic acid diesters of ethylene oxide and propylene oxide adducts of bisphenol A or bisphenol A hydride such as 2,2'-bis(4-acryloxy ethoxy phenyl)propane and 2,2'-bis(4-acryloxy propoxy phenyl)propane;

(e) urethane (meth)acrylates having two or more (meth)acryloyloxy groups in a molecule obtainable by pre-reacting a diisocyanate compound with a compound having two or more alcohol hydroxyl groups to provide a compound having end isocyanate groups, which is further reacted with (meth)acrylate having alcohol hydroxyl groups; and (f) epoxy (meth)acrylates having two or more (meth)acryloyloxy groups in a molecule obtainable by reacting a compound having two or more epoxy groups in a molecule with an acrylic acid or a methacrylic acid.

Examples of the compound having one ethylenic unsaturated double bond in a molecule include methyl(meth)acrylate, ethyl(meth)acrylate, n- and i-propyl(meth)acrylate, n-, sec- and t-butyl(meth)acrylate, 2-ethylhexyl(meth)acrylate, lauryl(meth)acrylate, stearyl(meth)acrylate, methoxyethyl(meth)acrylate, ethoxyethyl(meth)acrylate, hydroxyethyl(meth)acrylate, polyethylene glycol mono(meth)acrylate, polypropylene glycol mono(meth)acrylate, glycidyl(meth)acrylate, tetrahydrofurfuryl(meth)acrylate, N-hydroxyethyl(meth)acrylamide, N-vinylpyrolidone, N-vinyl-3-methylpyrolidone and N-vinyl-5-methylpyrolidone. The monomer may be used alone or in combination.

The monomer having 1 to 2 ethylenic unsaturated double bond(s) in a molecule is used in an amount of preferably 10 to 50 percent by weight, and more preferably 20 to 40 percent by weight based on the total amount of all components used to form the hardcoat layer. If the amount of the monomer having 1 to 2 ethylenic unsaturated double bond(s) in a molecule exceeds 50 percent by weight, a cured coating having sufficient abrasion resistance is not readily achieved. If the amount of the monomer having 1 to 2 ethylenic unsaturated double bond(s) in a molecule is less than 10 percent by weight, the flexibility of the coating may be decreased, and the adhesion between the coating and a laminated film disposed on the substrate film may be decreased.

According to the present invention, the components used to form the hardcoat composition can be cured by irradiating ultraviolet rays as active rays, or heating at an elevated temperature. In this case, it is preferable that a photopolymerization initiator or a thermal polymerization initiator be added to the hardcoat composition.

Examples of such a photopolymerization initiator include carbonyl compounds such as acetophenone, 2,2-diethoxy acetophenone, p-dimethyl acetophenone, p-diemthyl aminopropyophenone, benzophenone, 2-chloro benzophenone, 4,4'-dichloro benzophenone, 4,4'-bisdiethyl aminobenzophenone, Michler's ketone, benzyl, benzoin, benzoin methyl ether, benzoin ethyl ether, benzoin isopropyl ether, methylbenzoylformate, p-isopropyl-α-hydroxyisobutylphenone, α-hydroxyisobutylphenone, 2,2-dimethoxy-2-phenylacetophenone and 1-hydroxycyclohexyl phenylketone; and sulfur compounds such as tetramethyl thiuram monosulfide, tetramethyl thiuram disulfide, thioxanthone, 2-chlorothioxanthone and 2-methylthioxanthone. The photopolymerization initiator may be used alone or in combination. Examples of the thermal polymerization initiator include peroxides such as benzoyl peroxide and di-t-butyl peroxide.

The photopolymerization initiator or the thermal polymerization initiator is preferably used in an amount of 0.01 to 10 percent by weight based on 10 parts by weight of the components used to form the hardcoat layer. When electron rays or gamma rays are used for curing the hardcoat layer, the polymerization initiator is not necessarily added. When the hardcoat layer is thermally cured at an elevated temperature of 220° C. or more, the thermal polymerization initiator is not necessarily added.

It is preferable that a thermal polymerization inhibitor such as hydroquinone, hydroquinone monomethyl ether or 2,5-t-butylhydroquinone be added to the compositions used to form the hardcoat layer for use in the present invention in order to prevent thermal polymerization upon production and a dark reaction during storage. The thermal polymerization inhibitor is preferably used in an amount of 0.005 to 0.05 percent by weight based on the total amount of all components used to form the hardcoat layer.

The composition used to form the hardcoat layer preferably contains a polyisocyanate compound. The polyisocyanate compound in the composition used to form the hardcoat layer adheres the hardcoat layer directly to the substrate film in the absence of a primer layer, and decreases the iris pattern. The polyisocyanate compound is at least a dimer or more. Examples include 2,4- and/or 2,6-tolylenediisocyanate, 4,4'-diphenylmethanediisocyanate (MDI), polymeric MDI, 1,5-naphtylenediisocyanate, tolidinediisocyanate, 1,6-hexamethylenediisocyanate (HDI), trimethylhexamethylenediisocyanate, isophoronediisocyanate, xylylenediisocyanate (XDI), hydrogenated XDI, hydrogenated MDI, lysinediisocyanate, triphenylmethanetriisocyanate and tris (isocyanate phenyl)thiophospahte. The polyisocyanate compound can be used alone or in combination. Especially preferable are aliphatic polyisocyanate compounds represented by the following general formulas (1) to (3) or compounds derived therefrom in respect of adhesion, low coloring properties and surface hardness:

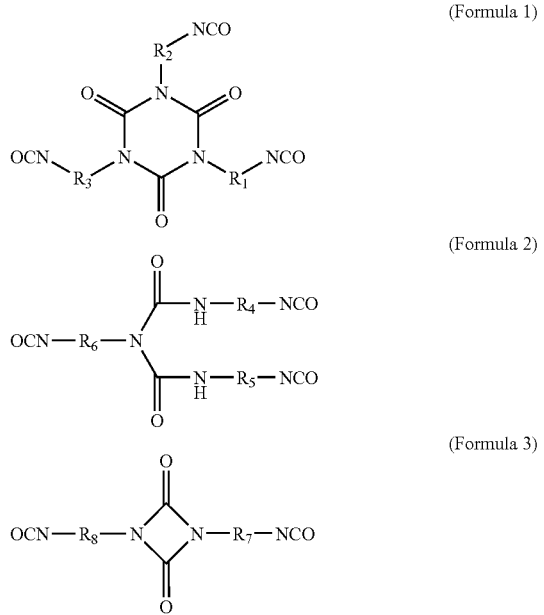

(Formula 1)

(Formula 2)

(Formula 3)

(where $R_1$ to $R_8$ are each independently aliphatic alkylene groups having 1 to 20 carbon atoms)

The polyisocyanate compound and/or the derivative is mixed with the composition used to form the hardcoat layer, and then coated over the substrate film. The polyisocyanate compound and/or the derivative is used in an amount of preferably 0.5 to 50 percent by weight, more preferably 1 to 30 percent by weight, and most preferably 3 to 20 percent by weight based on the total amount of all components used to form the hardcoat layer in respect to adhesion, surface hardness, moisture and heat resistance, and decreased iris pattern. If the amount of the polyisocyanate compound and/or the derivative is less than 0.5 percent by weight, adhesion is not sufficiently improved, and the iris pattern is not sufficiently decreased. If the amount of the polyisocyanate compound and/or the derivative exceeds 50 percent by weight, the surface hardness may be decreased.

Preferably, an organic metal catalyst is used to enhance the curing efficiency in the composition used to form the hardcoat layer containing polyisocyanate.

The organic metal catalyst is not especially limited, but includes an organic tin compound, an organic aluminum compound and an organic compound containing a 4 group element (titanium, zirconium or hafnium). Taking safety into consideration, a metal catalyst free of tin, i.e., an organic zirconium compound, an organic aluminum compound, and an organic titanium compound are preferably used. Examples of the organic tin compound include dibutyl tin fatty acid salts such as tetrabutyl tin, tetraoctyl tin, dibutyl tin dichloride and dibutyl tin dilaurate; and dioctyl tin fatty acid salts such as dioctyl tin dilaurylate.

Examples of the organic zirconium compound, the organic aluminum compound and the organic titanium compound include reaction products of ortho esters of these metals with β-ketoester (β-diketone). Specific examples include reaction products of a metal ortho ester such as zirconium tetra-n-propoxide, zirconium tetraisopropoxide, zirconium tetra-n-butoxide, titanium tetra-n-propoxide, titanium tetraisopropoxide, titanium tetra-n-butoxide, aluminum tetra-n-propoxide, aluminum tetraisopropoxide and aluminum tetra-n-butoxide with a β-ketoester (β-diketone) such as acetylacetone, methyl acetate, ethyl acetate, n-propyl acetoacetate, isopropyl acetoacetate and t-butyl acetoacetate. The mixing molar ratio of the metal ortho ester and β-ketoester (β-diketone) is preferably about 4:1 to 1:4, and more preferably 2:1 to 1:4. If the metal ortho ester exceeds the mixing molar ratio of 4:1, the catalyst has too high a reactivity to shorten the pot life. If β-ketoester (β-diketone) exceeds the mixing molar ratio of 4:1, the catalytic activity is undesirably lowered. According to the present invention, the organic metal catalyst is used in an amount of preferably 0.001 to 10 percent by weight, more preferably 0.01 to 5 percent by weight, and most preferably 0.01 to 2 percent by weight based on the hardcoat composition. If the amount is less than 0.001 percent by weight, the catalytic action is low. If the amount is more than 10 percent by weight, it is unfavorable from an economical viewpoint.

In a preferred embodiment, the hardcoat composition comprises 10 to 80 percent by weight of the multi-functional acrylate compound including at least one hydroxyl group, 1 to 30 percent by weight of the polyisocyanate compound and 0.001 to 10 percent by weight of the organic metal catalyst. As required, the hardcoat composition may further comprise 50 percent by weight or less of the monomer having 1 to 2 ethylenic unsaturated bond(s).

The hardcoat layer for use in the present invention may contain various types of additives as long as the advantages of the present invention are not inhibited. Examples include antioxidants, light stabilizers, stabilizers such as ultraviolet ray-absorbing agents, surfactants and antistatic agents.

The leveling agent is preferably used for smoothing the hardcoat layer. Examples include silicone-leveling agents, acrylic-leveling agents and fluorine-containing-leveling agents. A small amount of the silicone-leveling agent is very effective. The silicone-leveling agent preferably comprises a polydimethyl siloxane backbone to which polyoxyalkylene groups are added. Specific examples include dimethyl polysiloxane—polyoxy alkylene copolymer manufactured, for example, by Dow Corning Toray Silicone Co., Ltd. under the trade name of SH190.

When the lamination film is formed on the hardcoat layer, an acrylic-leveling agent that does not adversely affect adhesion is preferably applied. Examples of such an acrylic-leveling agent include the "ARUFON-UP1000" series, the "UH2000" series and the "UC3000" series (trade name) manufactured by Toagosei Co., Ltd. The leveling agent is added preferably in the amount of 0.01 to 5 parts by weight based on 100 parts by weight of the hardcoat composition.

According to the present invention, an organic solvent is added to enhance the working efficiency upon coating, controlling the coating thickness, and forming an inclusion layer in the substrate film. In view of a decrease in the film-forming speed caused by drying and preventing explosion in a drying furnace caused by solvent evaporation, the amount of organic solvent is preferably as low as possible. Preferably, the organic solvent has a solubility parameter which is close to that of the thermoplastic resin. The difference in the solubility parameters is preferably within ±1.0, and more preferably within ±0.8. For example, when the thermoplastic resin is polyethylene terephthalate having a solubility parameter of 10.7, N-methyl-2-pyrolidone having a solubility parameter of 11.3 is preferable.

The solubility parameter herein is calculated using the Fedors method. The calculation method is, for example, described in Properties of Polymers, chapter 7 (written by D. W. Van Kreveren, 1976, Elsevier). Depending on the structure of the compound used, the parameters of chemical species contained therein may not be determined. In this case, the solubility parameters cannot be calculated using the Fedors method, and instead analogous chemical species are used. For example, there is no parameter for $-SO_2-$, and therefore the parameters of $-S-$, $-O-$ and $-O-$ are used for calculation.

In the hardcoat film of the present invention, fine protrusions are preferably formed at an interface between the substrate film and the hardcoat layer. The protrusions are mountain-range-like discontinuous protrusions, and each has a length of 0.1 to 100 μm, preferably 0.1 to 30 μm, a width of 0.05 to 20 μm, preferably 0.05 to 10 μm, and a height of 0.05 to 2 μm, preferably 0.1 to 1 μm, and more preferably 0.2 to 0.7 μm in order to avoid the iris pattern. The fine protrusions can decrease the ripple amplitude of the reflectance, but do not adversely affect the film transparency.

The protrusions are formed by coating the composition containing the polyisocyanate component used to form the hardcoat over the substrate film that is adequately crystallized, i.e., to a crystallinity of about 3% to 25% measured at a cross-section using the Raman method. The composition used to form the hardcoat is selectively penetrated into the area of the substrate film where the crystallinity is low. Thereafter, the hardcoat film is preheated and drawn in the width direction. It is believed that fine irregularities (mountain-range-like protrusions) are formed due to different drawing properties between penetrated areas and non-penetrated areas over the substrate film. The present inventors found that such a phenomenon occurs when a polyisocyanate compound is contained in the composition used to form the hardcoat. This phenomenon is also advantageous for improving the adhesion between the hardcoat layer and the substrate film.

The film drawn in the width direction is then heat-treated at an elevated temperature of about 220° C. to 245° C. to cure the hardcoat layer and to improve the adhesion to the substrate film. A longer heating time is preferable, but is actually about 10 to 30 seconds depending on the temperature. When the film is formed at high speed and the quantity of heat is insufficient, it is effective to irradiate active rays such as ultraviolet rays to cure the film after heat treatment.

In order to provide a substrate film that is adequately crystallized, a surface of undrawn film that is melted and extruded is placed in contact with high temperature rolls, or the surface of the film is heated using a radiation heater to draw the film in the longitudinal direction. The film is preferably drawn to about 2.5 to 3.2 times. A crystal nucleation agent is added to the film to promote crystallization and to form microcrystals.

A non-limiting preferred method for producing the hardcoat film using polyethylene terephthalate (hereinafter referred to as "PET") as the substrate film of the present invention will be described below.

PET pellets (limiting viscosity of 0.62 dl/g) containing 0.2 percent by weight of silica particles having a mean particle size of 0.3 μm are dried at 180° C. for about 2 hours under a vacuum to sufficiently remove water, fed into an extruder, and melted and extruded through a T-shaped die at 260° C. to 300° C. to provide a sheet. The resultant sheet is cooled and solidified on a mirror-finished cooling drum to provide an undrawn sheet. It is preferable that a static electricity-applying method be used in order to improve the adhesion to a cast drum. Thereafter, the resultant undrawn sheet is drawn to 2 to 5 times in the longitudinal direction with a group of rolls heated at 70° C. to 120° C. Drawing in the longitudinal direction is preferably conducted such that crystal orientation in the longitudinal direction is low and thermal crystallization proceeds. Preferably, the film is drawn while heating by the radiation heater. Then, the composition containing the polyisocyanate component used to form the hardcoat layer is coated over the surface of the uniaxially drawn film. Clips grip both ends of the film to propel it through a tenter. The film is pre-heated in the tenter to draw it about 2 to 5 times in the width direction. The resultant laminated film is relaxed 3% to 10% and heated at about the glass transition temperature to the melting point of the resin, i.e., at 200° C. to 245° C. in the case of PET, to complete the crystallization of the substrate film and the curing of the coating film. Advantageously, a curling is significantly omitted.

The composition used to form the hardcoat layer can be coated by various coating methods including a reverse-coating method, a gravure-coating method, a rod-coating method, a bar-coating method, a die-coating method, a spray-coating method, and the like.

Active rays for use in the present invention are electromagnetic waves for polymerizing acrylic vinyl groups including ultraviolet rays, electron beams and radiation (α rays, β rays, and γ rays). In practice, ultraviolet rays are convenient and preferable. As the ultraviolet rays, an ultraviolet ray fluorescent lamp, a low-pressure mercury lamp, a high-pressure mercury lamp, a xenon lamp, and a carbon arc lamp are suitable. When the active rays are irradiated under a low oxygen concentration, the film can be efficiently cured. As for the electron beam method, although the device is expensive and needs to be operated under an inactive gas atmosphere, it is advantageous in that a photopolymerization initiator or a photosensitizer is not required to be contained in the coating layer.

In the thermal curing according to the present invention, air and an inactive gas are heated to at least 140° C. or more using a steam heater, an electric heater, an infrared heater or a far infrared heater, and are blown as a heat source to the substrate and the coating film through a slit nozzle. The heat source is preferably air heated at 200° C. or more, and is more preferably nitrogen heated at 200° C. or more because the curing speed is higher.

The hardcoat layer has a thickness of preferably 0.1 to 30 μm, and more preferably 1 to 15 μm depending on the applications. If the hardcoat layer has a thickness of less than 0.1 μm, it is too thin to provide sufficient surface hardness even if it is fully cured, whereby it may be easily scratched. If the hardcoat layer has a thickness exceeding 30 μm, the cured film may be easily cracked by folding stress.

A printed layer having graphics may be disposed at an outermost layer of the hardcoat layer, as long as the advantages of the present invention are not inhibited.

The resultant hardcoat film can be adhered to various functional films by various methods. A sticking layer or a conductive layer may be laminated on the other side of the hardcoat film.

For example, in the hardcoat film of the present invention, an opposite surface of the hardcoat layer can be adhered to a mating material using various adhesive agents to add abrasion resistance and scratch resistance attributed to the hardcoat layer to the mating material. Non-limiting adhesive agents including rubber, acrylic, silicone or polyvinylether adhesive agents can be used as long as two objects are adhered.

The adhesive agents are roughly classified into two groups: solvent-type adhesive agents, and solventless-type adhesive agents. Although solvent-type adhesive agents are still mainly used due to their excellent drying properties, productivity and workability, solventless-type adhesive agents are becoming more commonly used instead in recent years taking pollution, energy conservation, resources saving and safety into consideration. Among them, active ray curing-type adhesive agents are preferable because they are cured within a few seconds by irradiating active rays and have excellent flexibility, adhesive properties, and chemical resistance.

Specific but non-limiting examples of active ray curing-type acrylic adhesive agents are described, for example, in a Japanese language publication whose translated title reads "Adhesive agent databook" edited by The adhesion society of Japan, published by THE NIKKAN KOGYO SHIMBUN, LTD., pp. 83-88, in 1990. Examples of commercially available multi-functional acrylic ultraviolet curing coating agents include, but are not limited thereto, the "XY" (trade name) series manufactured by Hitachi Kasei Polymer Co., Ltd., the "Hirock" (trade name) series manufactured by Toho Chemical Industry Co., Ltd., the "Three Bond" (registered trademark) series manufactured by Three Bond Co., Ltd., the "Arontite" (registered trademark) series manufactured by Toagosei Co., Ltd., the "Cemerock" (registered trademark) series manufactured by Cemedine Co., Ltd., and the like.

When such an adhesive agent is applied to a normal biaxial drawn polyester film, the adhesive property is insufficient. In order to improve the adhesion between the polyester film and the adhesive layer, various primer treatments are performed. For example, a lamination film made of an acrylic resin, a polyester resin, or an urethane resin is disposed.

According to the present invention, a primer layer may be disposed at an opposite surface of the hardcoat layer to improve the adhesion to the adhesive layer. The primer layer may be coated over the opposite surface of the hardcoat layer, dried, in some cases, and drawn, at the same time the coating liquid containing the active ray curing-type or thermosetting composition is applied to the hardcoat layer.

The thus-obtained hardcoat film of the present invention can be efficiently produced, since the hardcoat layer can be formed at the same time as the film-forming steps. Also, the hardcoat film has excellent surface hardness, abrasion resistance, adhesion between the hardcoat layer and the substrate film, less iris patterns, and a good clear view property, and can be used in a wide variety of applications. In particular, the hadcoat film is suitably used as an antireflection film substrate, a touch panel substrate, a substrate for pasting a window, a nameplate substrate, and the like.

The antireflection film of the present invention will be described below.

Figure 2:
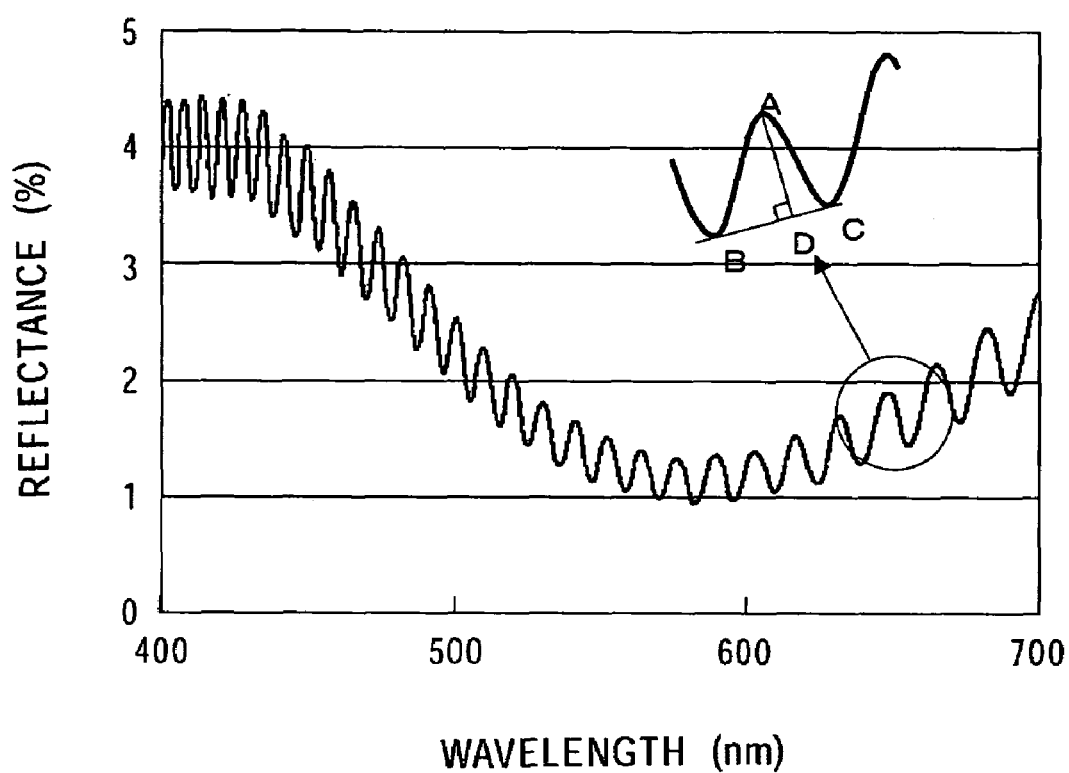
FIG. 2 is a surface reflection spectrum of a conventional antireflection film in Comparative Example 6.
Figure 3:
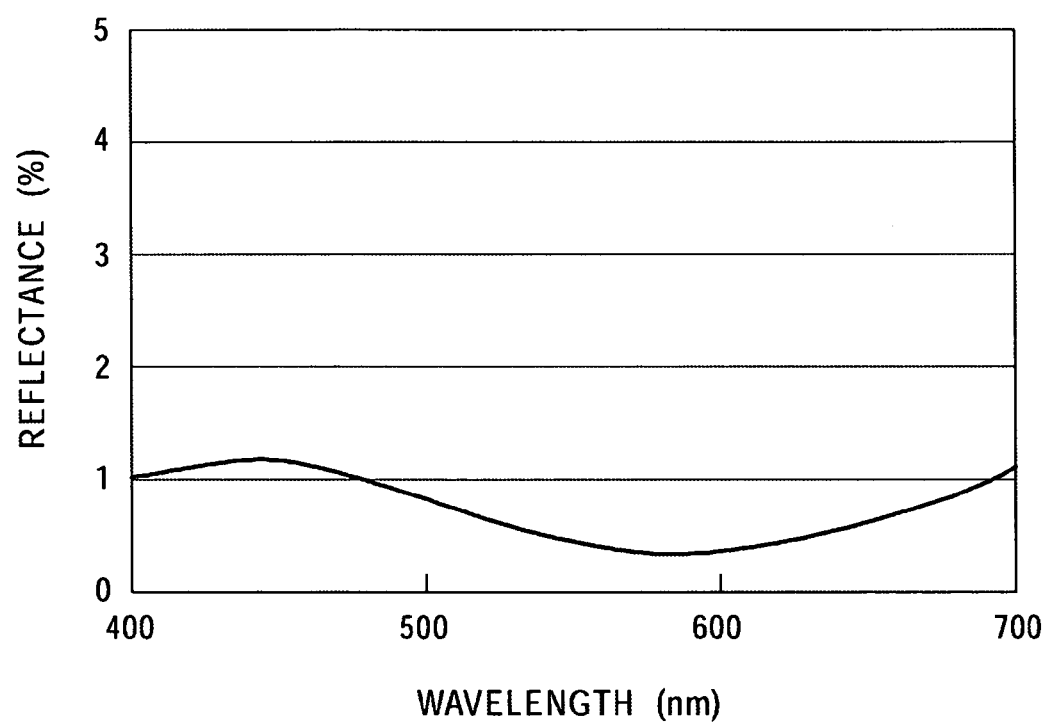
FIG. 3 is a surface reflection spectrum of an antireflection film of the present invention in Example 19.
Figure 4:
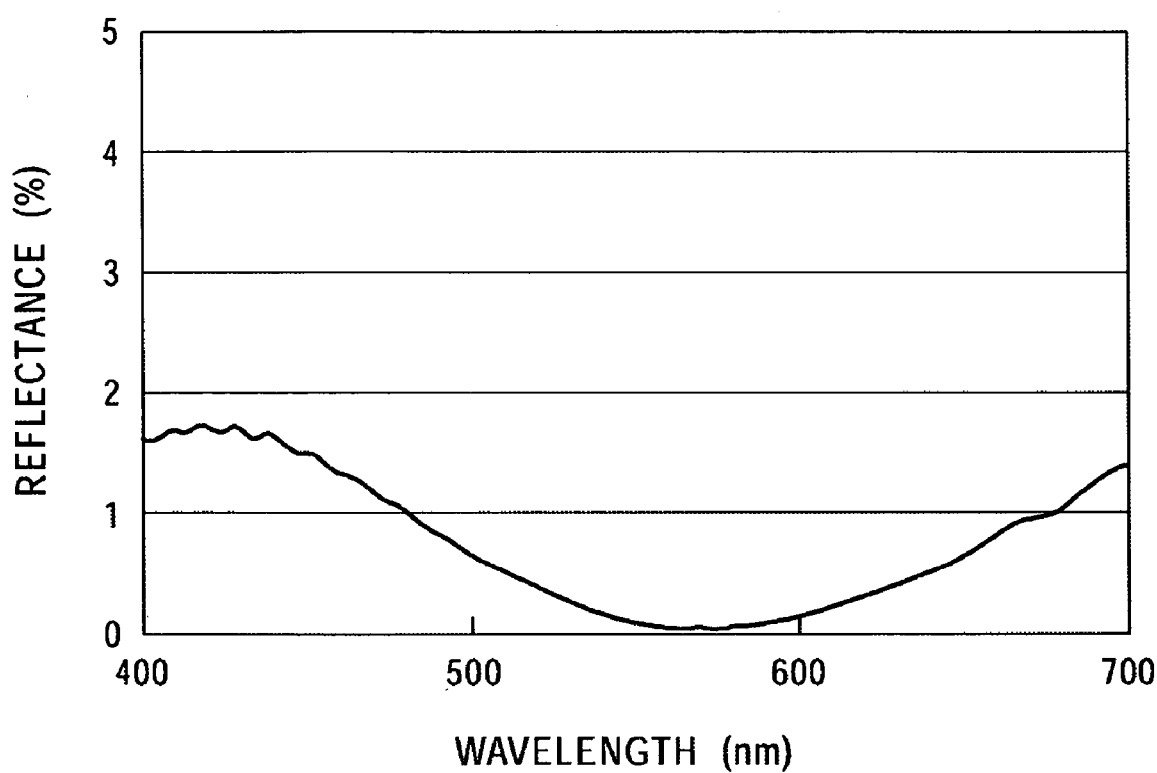
FIG. 4 is a surface reflection spectrum of an antireflection film of the present invention in Example 29.

The antireflection film comprises a hardcoat film, and a high refractive index layer and a low refractive index layer sequentially laminated over the hardcoat layer, wherein the surface reflection spectrum at a wavelength within 400 to 700 nm satisfies all the following three conditions: (1) a minimum reflectance of 0.6% or less, (2) a reflectance at a wavelength of 400 nm of 3.5% or less, and (3) a reflectance at a wavelength of 700 nm of 3% or less. If the minimum reflectance exceeds 0.6%, the antireflection properties is insufficient. If the reflectance at a wavelength of 400 nm exceeds 3.5%, reflected light has an undesirable blue tone. Similarly, if the reflectance at a wavelength of 700 nm exceeds 3%, reflected light has an undesirable red tone. It is more preferable that the minimum reflectance be 0.5 or less, the reflectance at a wavelength of 400 nm be 3.0% or less, and the reflectance at a wavelength of 700 nm be 2.5% or less, and most preferably 2.0% or less. FIG. 2 is a surface reflection spectrum of a conventional antireflection film. FIGS. 3 and 4 are surface reflection spectra of the antireflection film of the present invention. As shown in FIG. 2, the conventional antireflection film has high minimum reflectance, insufficient antireflection properties, high reflectance at a wavelength of 400 nm, and the reflected light has a blue tone and is not neutral.

In the antireflection film of the present invention, the surface reflection spectrum at a wavelength within 400 to 700 nm has a maximum amplitude of preferably 0.5% or less, more preferably 0.2% or less, and most preferably 0.1% or less to decrease interference fringes.

Referring to FIG. 2, the maximum ripple amplitude at a wavelength within 400 to 700 nm will be described. An opposite surface of the surface to be measured (the surface of the antireflection layer) is roughened such that the gloss at 60° (JIS Z 8741) is 10 or less. Then, the roughened surface is colored in black to produce a sample such that the transmittance of visible rays is 5% or less. The surface of the sample is measured using a spectrophotometer at an incidence angle of 5 degrees for a surface reflection spectrum at a wavelength within 380 to 800 nm. FIG. 2 shows the results. As shown in FIG. 2, a ripple spectrum curve is observed. The term "ripple" herein means that the reflectance is changed above and below in accordance with the change in the wavelength. The smaller the amplitudes of the ripples, the less the interference fringes are. A perpendicular from a peak (maximum point A) of a crest to a line BC connecting opposite peaks (minimum points B, C) of adjacent roots is drawn. The perpendicular meets the line BC at point D. The amplitude is defined as a line AD. The maximum amplitude of the ripples is determined within a wavelength of 400 to 700 nm. The ripples shown in FIG. 2 are produced by the interference fringes at an interface between the substrate film and the hardcoat layer. When the interference fringes at an interface between the substrate film and the hardcoat layer are decreased, the amplitude can be small. The details will be described later.

The antireflection film of the present invention is often disposed at an outermost surface of a display. It is not preferable that the surface of the antireflection film be damaged when dust attached over the surface is wiped with a cloth. Accordingly, the antireflection film has scratch resistance of preferably class 3 or more, and more preferably class 4 or more. The scratch resistance is determined as follows: a #0000 steelwool which is applied a load of 250 g rubs in a reciprocating manner 10 times over the surface of the antireflection film at a stroke width of 10 cm, and a speed of 30 mm/sec. The surface of the antireflection film was observed visibly and evaluated according to the following five classes: class 5: no scratches, class 4: 1 to 5 scratches, class 3: 6 to 10 scratches, class 2: 11 or more scratches, and class 1: many scratches over the entire surface.

Figure 5:
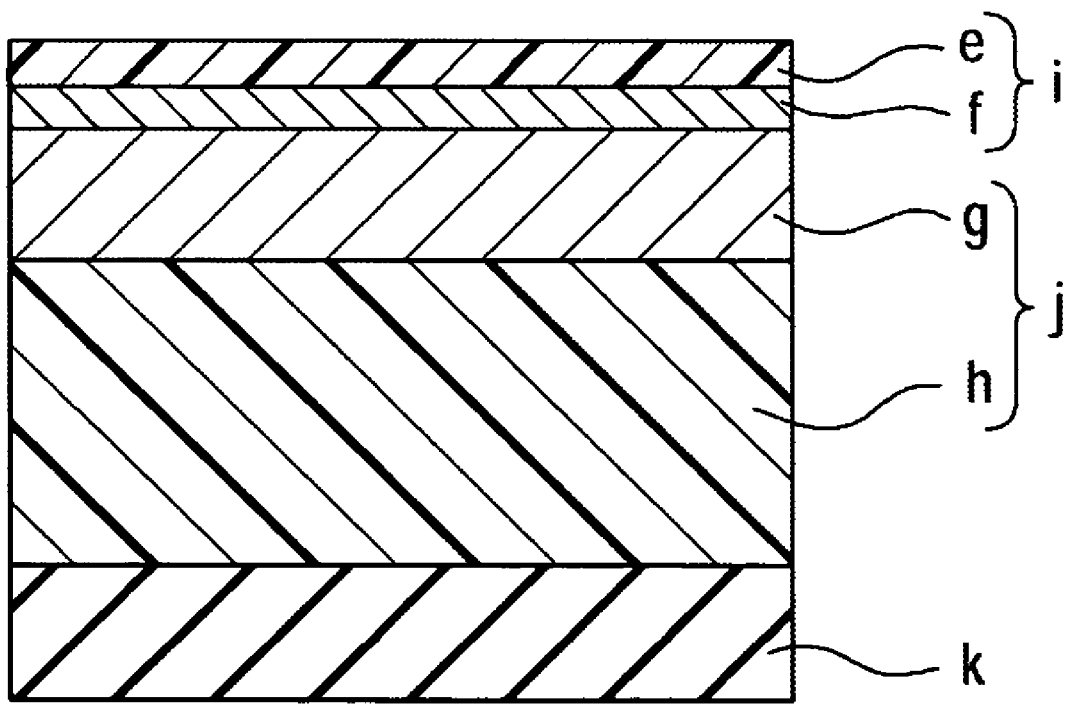
FIG. 5 is a schematic view showing a cross-section of an antireflection film of the present invention.

FIG. 5 is a schematic view showing a cross-section of a preferred embodiment of the antireflection film of the present invention. A hardcoat film (j) comprises a substrate film (h) and a hardcoat layer (g) disposed thereon. On the hardcoat film (j), an antireflection layer (i) consisting of a high refractive index layer (f) and a low refractive index layer (e) is laminated. On an opposite surface of the substrate film (h), an adhesive layer (k) is laminated.

In the antireflection film of the present invention, the minimum reflectance of the surface reflection spectrum, the reflectance at a wavelength of 400 nm, and the reflectance at a wavelength of 700 nm should be within the defined range by adjusting the refractive indices and the thicknesses of the low refractive index layer (e) and the high refractive index layer (f). Specifically, the low refractive index layer (e) has a refractive index ($n^e$) of 1.42 or less, and a difference in refractive indices between the low refractive index layer and the high refractive index layer is 0.15 or more. The high refractive index layer (f) has a refractive index ($n_f$) of preferably 1.50 to 1.70, and more preferably 1.55 to 1.69. The low refractive index layer (e) has a refractive index ($n_e$) of preferably 1.25 to 1.42, and more preferably 1.30 to 1.38.

It is also preferable that a refractive index of the hardcoat layer (g) be adjusted. The hardcoat layer (g) has the refractive index ($n_g$) of preferably 1.45 to 1.55. The minimum reflectance can be lowered, when the refractive index ($n_c$) of the low refractive index layer (e) and the refractive index ($n_f$) of the high refractive index layer (f) satisfy the following equations (1) and (2).

$$(n_f) = (n_e) \times (n_g)^{1/2} \pm 0.02 \quad (1)$$

$$(n_e) = (n_f)/(n_g)^{1/2} \pm 0.02 \quad (2)$$

In the antireflection film of the present invention, the product of the refractive index and the thickness of each of the high refractive index layer (f) and the low refractive index layer (e) is preferably ¼ of the wavelength of the objective light (generally, visible light). In other words, four times of the product of the thickness d and the refractive index n are within 400 to 700 nm in the high refractive index layer (f) and the low refractive index layer (e). In the antireflection film of the present invention, the minimum reflectance of the surface reflection spectrum is 0.6% or less, the reflectance at a wavelength of 400 nm is 3.5% or less, and the reflectance at a wavelength of 700 nm is 3% or less, when the refractive index n and the thickness d each of the high refractive index layer (f) and the low refractive index layer (e) satisfy the following equation (3).

$$n \times d = \lambda/4 \quad (3)$$

(where $\lambda$ is within the visible light wavelength, typically 380 nm $\leq \lambda \leq$ 780 nm)

The high refractive index layer (f) has a thickness of preferably 0.01 to 1.0 µm, and more preferably 0.06 to 0.12 µm, and the low refractive index layer (e) has a thickness of preferably 0.01 to 1.0 µm, and more preferably 0.07 to 0.12 µm so that the lamination film of the present invention is provided with the low reflectivity. When the thicknesses of the high refractive index layer (f) and the low refractive index layer (e) are within the ranges, they can easily satisfy the equation (1) to provide the low refractive index layer (e) having the low surface reflectance.

The low refractive index layer (e) preferably comprises a silane-coupling agent [1] and a fluororesin having an alkoxysilyl group [2]. The silane-coupling agent [1] is a compound represented by the general formula $R(1)_a R(2)_b SiX_{4-(a+b)}$ or a hydrolyzed product thereof, where $R(1)_a$ and $R(2)_b$ are each a hydrocarbon group having an alkyl group, an alkenyl group, an allyl group, a halogen group, an epoxy group, an amino group, a mercapto group, a methacryloxy group or a cyano group; X is a hydrolyzable substituent selected from an alkoxy group, an alkoxyalkoxy group, a halogen group and acyloxy group; a and b are each 0, 1 or 2, and a+b is 1, 2 or 3. The fluororesin having an alkoxysilyl group [2] is a compound represented by the general formula $R(3)_c R(4)_c SiX_{4-(c+d)}$ or a hydrolyzed product thereof, where $R(3)_c$ and $R(4)_d$ are each a fluorine-substituted hydrocarbon group having a alkyl group, an alkenyl group, an allyl group, a methacryloxy group or a (meth)acryloyl group; X is a hydrolyzable substituent selected from an alkoxy group, an alkoxyalkoxy group, a halogen group and acyloxy group; c and d are each 0, 1, 2 or 3 and c+d is 1, 2 or 3. Upon forming the low refractive index layer (e) according to the present invention, various additives such as polymerization inhibitors, antioxidants, dispersants, leveling agents and the like may be added, as required.

The low refractive index layer (e) may further contain silica fine particles [3] for increasing the hardness. Examples of the silica particles [3] include dry silica, wet silica, or silica fine particles in a colloidal state. Preferably, the silica particles are spherical having a uniform particle size distribution. The silica particles [3] have an average primary particle size (spherical size: the BET method) of 0.001 to 0.2 µm, and preferably 0.005 to 0.15 µm.

By adding the fine particles, the low refractive index layer (e) has irregularities caused by the fine particles. In addition to the antireflection for interference, the irregularities can provide antireflection for scattering, whereby it is possible to lower the reflectance of the surface reflection spectrum within the wavelength of 400 to 700 nm. The low refractive index layer (e) has a surface roughness: a center line average Ra of 0.5 to 15.0 nm, and a maximum height Rmax of 5 to 150 nm. If Ra and Rmax are less than the specified value, the antireflection effect is decreased. If Ra and Rmax exceed the specified value, the haze and the scratch resistance become poor, and fingerprints are not easily wiped out.

It is also preferable that air bubbles be contained in the composition for decreasing the refractive index. In this case, the low refractive index layer (e) has a porosity of preferably 5% or more, and more preferably 10% or more. Non-limiting examples of providing the air bubbles include: bubbling the coating film upon drying; adding organic or inorganic particles to form voids at a particle interface utilizing curing shrinkage upon drying; and adding organic or inorganic particles that are hollow or contain air bubbles. From the viewpoint of a control of the refractive index by adjusting the porosity, adding organic or inorganic particles that are hollow or contain air bubbles is preferable.

Specifically, the silica particles [3] are porous or hollow silica particles. The silica particles have a porosity of preferably 5% or more, and more preferably 30% or more.

Examples of the hollow particles are disclosed in the publications such as Japanese Unexamined Patent Application Publication No. 2001-233611 and J. Am. Chem. soc. 2003, 125, pp. 316-317. A combination of the particles having different particle sizes can increase the concentration of the hollow particles to decrease the refractive index.

The low refractive index layer (e) is formed by applying, drying and curing the composition comprising the silane-coupling agent [1], the fluororesin having an alkoxysilyl group [2], or the copolymer thereof, and, if required, the silica particles [3] dispersed in at least one or more solvent selected from methanol, ethanol, isopropyl alcohol, n-butanol, tert-butanol, ethylene glycol monomethyl ether, 1-methoxy-2-propanol, propylene glycol monomethyl ether, cyclohexanone, butyl acetate, isopropyl acetone, methyl ethyl ketone, methyl isobutyl ketone, diacetyl acetone, and acetyl acetone. The scratch resistance can be improved.

The amount of the solvent varies depending on the intended viscosity of the composition, the intended thickness of the hardened coat, the drying temperature and the like. Specifically, the amount of the solvent is preferably 0.05 to 100 parts by weight, more preferably 0.1 to 50 parts by weight, and most preferably 1 to 40 parts by weight based on 1 parts by weight of the coating liquid comprising the silane-coupling agent [1], the fluororesin having an alkoxysilyl group [2], and the silica particles [3].

A curing catalyst for promoting a condensation reaction of the silane-coupling agent [1]. An example of the curing catalyst is an acid compound, preferably a Lewis acid compound. Specific examples of the Lewis acid compound is metal alkoxides such as acetacetoxy aluminum and metal chelates. The amount of the curing catalyst can be selected. Typically, 0.1 to 10 parts by weight of the curing catalyst is used based on 100 parts by weight of the silane-coupling agent [1].

The low refractive index layer (e) comprises 0.2 to 0.4 of the silane-coupling agent [1], 0.2 to 0.4 of the fluororesin having an alkoxysilyl group [2], and 0.2 to 0.6 of the silica particles [3] on a solid ratio basis in view of the optical properties such as the reflectance, and the surface hardness. An atomic ratio of F/Si on the coating film is 0.5 to 5.0, and preferably 0.7 to 3.0 in view of the scratch resistance and soil resistance. The atomic ratio can be determined by the Electron Spectroscopy for Chemical Analysis (ESCA analysis).

The high refractive index layer (f) may comprise a binder (A) alone, but preferably further comprises metal compound particles (B) in order to give antistatic resistance over the resultant antireflection film. One of the binder component (A) is a (meth)acrylate compound. The (meth)acrylate compound is radically polymerized by irradiating the active rays to improve solvent resistance and hardness of the film formed. Especially preferred is a multifunctional (meth)acrylate compound having two or more (meth)acryloyl groups in the molecule in that the solvent resistance and the like are improved. Examples include trifunctional (meth)acrylates such as pentaerythritol tri(meth)acrylate, trimethylolpropane tri(meth)acrylate, glycerol tri(meth)acrylate, ethylene-modified trimethylol propane tri(meth)acrylate and tris-(2-hydroxyethyl)-isocyanuric acid ester tri(meth)acrylate; and tetrafunctional or more (meth)acrylate such as pentaerythritol tetra(meth)acrylate, dipentaerythritol penta(meth)acrylate and dipentaerythritol hexa(meth)acrylate.

The (meth)acrylate compound of the binder (A) has acid functional groups such as a carboxyl group, a phosphoric acid group and a sulfonic acid group to improve dispersibility of the metal compound particles. Examples of an acid functional group-containing monomer include unsaturated carboxylic acids such as acrylic acids, methacrylic acids, crotonic acids, 2-methacryloyl oxyethyl succinate and 2-methacryloyl oxyethyl phthalate; phosphoric acid (meth) acrylic esters such as mono(2-(meth)acryloyl oxyethyl)acid phosphate and diphenyl-2-(meth)acryloyl oxyethyl phosphate; 2-sulfo ester (meth)acrylate and the like. Additionally, an acrylate compound having a polar group such as an amide linkage, a urethane linkage, and an ether linkage can be used.

The metal compound particles (B) are preferably various conductive metal oxide particles. Examples include tin-containing antimony oxide particles (ATO), zinc-containing antimony oxide particles, tin-containing indium oxide particles (ITO), zinc oxide/aluminum oxide particles, antimony oxide particles and the like. Preferred is the tin-containing indium oxide particles (ITO).

The conductive metal compound particles (B) have an average primary particle size (spherical size: the BET method) of 0.5 µm or less, preferably 0.001 to 0.3 µm, and most preferably 0.005 to 0.2 µm. If the average primary particle size exceeds the range, transparency of the high refractive index layer (f) is decreased. If the average primary particle size is less than the range, the metal compound particles are easily aggregated to increase the haze value of the high refractive index layer (f). In either case, it may be difficult to provide the desired haze value.

According to the present invention, the high refractive index layer (f) can further comprise conductive polymers such as polypyrrole, polythiophene and polyaniline, and organic metal compounds such as metal alcoholate and chelate compounds in order to further improve the conductivity.

When the high refractive index layer (f) is formed, an initiator may be used to promote the curing of the applied binder. The initiator initiates or promotes radical, anionic or cationic polymerization and/or cross-linking reaction of the applied binder. Examples include conventionally known various photopolymerization initiators including thioxanthone derivatives, azo compounds, diazo compounds, aromatic carbonyl compounds, dialkylamino benzoic esters, peroxides, acridine derivatives, phenazine derivatives and quinoxaline derivatives. The photopolymerization initiator is added in an amount of 0.1 to 20 parts by weight, and preferably 1 to 15 parts by weight based on 100 parts by weight of the binder (A). Within the range, the photopolymerization occurs rapidly, light irradiation time to provide sufficient hardness and the scratch resistance is short. Also, the conductivity, the abrasion resistance, weatherability and the like are not lowered.

When the high refractive index layer (f) is formed, an amine compound may be added in the photopolymerization initiator in order to prevent an decrease in sensitivity caused by oxygen inhibition. As required, various additives such as a polymerization inhibitor, a curing catalyst, an antioxidant, a dispersant, a leveling agent and a silane-coupling agent may be added. Furthermore, alkyl silicates and their hydrolyzed products thereof; inorganic particles such as colloidal silica, dry silica, wet silica and titanium oxide; silica fine particles in a colloidal state; in order to improve the surface hardness.

According to the present invention, the high refractive index layer (f) comprises the binder (A) and the metal compound particles (B) at a weight percentage of 10/90 to 30/70, and preferably 15/85 to 25/75. The metal compound particles (B) are included within the above-specified weight percentage, the resultant film is sufficiently transparent, has good conductivity as well as physical and chemical properties.

The composition of the high refractive index layer (f) is controlled so that the high refractive index layer (f) has a surface resistivity of preferably $1\times10^{11}$ Ω/square or less, and more preferably $1\times10^{10}$ Ω/square or less in order to add the antistatic property at the desired level.

The high refractive index layer (f) has a total light transmittance of preferably 40% or more, and more preferably 50% or more in view of clearness and transparency.

The high refractive index layer (f) is formed by preparing the coating liquid favorably dispersed in the solvent, applying, drying and curing the coating liquid over the hardcoat layer (g).

The solvent used for the preparation of the high refractive index layer (f) is for improving the coating and printing work efficiencies and the dipersibility of the metal compound particles, and for dissolving the binder (A). Any conventionally known various organic solvents can be used. In the present invention, the organic solvent preferably has a boiling point of 60° C. to 180° C. in view of viscosity stability and a drying property of the composition. Especially, the organic solvent including oxygen atoms is suitable since it is well compatible with the metal compound particles. Examples of the organic solvents include methanol, ethanol, isopropyl alcohol, n-butanol, tert-butanol, ethylene glycol monomethyl ether, 1-methoxy-2-propanol, propylene glycol monomethyl ether, cyclohexanone, butyl acetate, isopropyl acetone, methyl ethyl ketone, methyl isobutyl ketone, diacetyl acetone, and acetyl acetone. These may be used alone or in combination.

The organic solvent is used in any amount for providing good working viscosity depending on coating means and printing means. Typically, the amount of the organic solvent is such that a solid percentage of the composition is 60 percent by weight or less, and preferably 50 percent by weight or less. The composition used to form the photocuring conductive film according to the present invention can be prepared in various ways. In a preferred embodiment, the metal compound particles (B) are added to a solution that the binder (A) is dissolved in the organic solvent, and dispersed using a disperser such as a paint sheaker, a ball mill, a sand mill, three rolls, an attritor and a homo mixer. Thereafter, the photopolymerization initiator is added and dissolved uniformly.

The antireflection film of the present invention has the haze of preferably 1% to 3%, and more preferably 1.05% to 2.95%. If the haze is within the range, sufficient transparency can be provided.

The hardcoat layer (g) comprises, but not limited to, a composition including a (meth)acrylate compound. Examples include a monofunctional acrylate compound such as methyl(meth)acrylate, n-butyl(meth)acrylate, polyester(meth)acrylate, lauryl(meth)acrylate, hydroxyethyl (meth)acrylate and hydroxypropyl(meth)acrylate. Especially preferred is a multifunctional (meth)acrylate having (meth)acryloyl groups in the molecule since solvent resistance is improved. Specific examples of the multifunctional (meth)acrylate include pentaerythritol tri(meth)acrylate, pentaerythritol tetra(meth)acrylate, dipentaerythritol tri (meth)acrylate, dipentaerythritol tetra(meth)acrylate, dipentaerythritol penta(meth)acrylate, dipentaerythritol hexa(meth)acrylate and trimethylolpropane tri(meth)acrylate. These monomers can be used alone or in combination. Also, it may contain fine particles such as silica, and reactive silicon compounds such as tetraethoxy silane. Among them, the composition containing an ultraviolet ray curing-type multifunctional (meth)acrylate is preferable from the view point of productivity and hardness.

As described above, it is important to decrease the interference fringes at an interface between the substrate film (h) and the hardcoat layer (g) in order to decrease the ripple fringes.

Preferably, the adhesion-promoting layer is disposed between the substrate film and the hardcoat layer in order to improve the adhesion. As described above, since the adhesion-promoting layer easily induce interference fringes, it is needed to decrease them. Preferably, in order to decrease the interference fringes, the adhesion-promoting layer has a refractive index of 1.52 to 1.66, and satisfies the equation: (refractive index of the adhesion-promoting layer)={(refractive index of the substrate film)}×(refractive index of the hardcoat layer)}$^{1/2}$±0.02. Any material can be used for the adhesion-promoting layer as long as it can be well adhered to the substrate film and the hardcoat layer and can provide the above-defined refractive index. Preferably, water-dispersing polyester-based resin, and water-dispersing polyurethane-based resin are used. The adhesion-promoting layer is coated and formed during the substrate film-forming step, and has a thickness of 0.08 to 0.20 μm.

Even if the hardcoat film of the present invention has no adhesion-promoting layer, it can provide high adhesion and no interference fringes. Therefore, it is very suitable for use in the antireflection film of the present invention.

In the antireflection film of the present invention, the adhesive layer (k) can be formed at an opposite surface of the substrate film (h). Non-limiting material can be used for the adhesion layer (k) as long as two objects are adhered. Examples include rubber-based adhesives, vinyl polymerization-based adhesives, condensation polymerization-based adhesives, thermosetting resin-based adhesives, and silicone-based adhesives. Specific examples of the rubber-based adhesives include butadiene-styrene copolymer (SBR) adhesives, butadiene-acrylonitrile copolymer (NBR) adhesives, chloroprene polymer adhesives, and isobutylene-isoprene copolymer (butyl rubber) adhesives. Specific examples of the vinyl-polymerization-based adhesives include acrylic resin adhesives, styrene resin adhesives, vinyl acetate—ethylene copolymer adhesives, and vinyl chloride—vinyl acetate copolymer adhesives. Specific examples of the condensation polymerization-based adhesives include polyester resin adhesives. Specific examples of the thermosetting resin adhesives include epoxy resin adhesives, urethane resin adhesives, and formalin resin adhesives. These adhesives can be used alone or in combination.

Also, the adhesive may be solvent-type or solventless-type. The adhesive layer (k) is formed with the above-described adhesives using ordinary techniques such as coating. The adhesive layer (k) may contain a coloring agent by simply mixing the coloring agent such as a pigment and a dye with the adhesive. When the adhesive layer contains the coloring agent, the lamination film desirably has light transmittance at a wavelength of 550 nm of within 40% to 80%.

The antireflection film of the present invention has high surface hardness and scratch resistance, and can be used for wide variety of applications including a membrane switch, a curve mirror, a back mirror, a goggle, a window glass, a poster, an advertising tower, a nameplate, an instrument cover, various commercial displays and the like. The anti-reflection film is adhered to a front side of a display panel and/or a transparent optical filter via the adhesive layer to provide an equipment for display including a liquid display device (LCD), a plasma display panel (PDP), an electroluminescence display (ELD), a cathode ray tube (CRT) display, and a portable digital assistant (PDA).

[Measurement and Evaluation of Various Properties]

Various properties were measured and evaluated as follows:

1. Evaluation of Hardcoat Film (1) Adhesion (Under Ordinary Conditions)

100 cross cuts of 1 mm$^2$ were made on each hardcoat layer of hardcoat film samples under ordinary conditions (at 23° C., relative humidity of 65% RH). A cellophane tape manufactured by Nichiban Co., Ltd. was adhered thereto. A rubber roller was pressed with a load of 19.6 N in a reciprocating manner 3 times over the tape. The cellophane tape was peeled away at an angle of 90°. The numbers of unpeeled hardcoat layer portions were counted to evaluate at the following four scales: A: 100, B: 80 to 99, C: 50 to 79, and D: 0 to 49. The A and B represent excellent adhesion.

(2) Adhesion (Under Abrasion Conditions)

Each hardcoat film sample was allowed to stand under ordinary conditions (at 23° C., relative humidity of 65% RH). The surface of the hardcoat film was abraded with a #0000 steelwool which was applied a load of 1 kg/cm$^2$ in a reciprocating manner 20 times (at a speed of 20 cm/sec). 100 cross cuts of 1 mm$^2$ were made on the hardcoat layer. A cellophane tape manufactured by Nichiban Co., Ltd. was adhered thereto. The rubber roller was pressed with a load of 19.6 N in a reciprocating manner 3 times over the tape. The cellophane tape was peeled away at an angle of 90° for 3 times. The numbers of unpeeled hardcoat layer portions were counted to evaluate in four scales: A: 100, B: 80 to 99, C: 50 to 79, and D: 0 to 49. The A and B represent excellent adhesion.

(3) Adhesion (Under Wet Heat Conditions)

Each hardcoat film sample was allowed to stand under wet heat conditions (at 80° C., relative humidity of 85% RH) for 48 hours. After that, the hardcoat film was immediately taken out therefrom, was allowed to stand under ordinary conditions (at 23° C., relative humidity of 65% RH) for 5 minutes, and evaluated as in (1) Adhesion (under ordinary conditions) described above.

(4) Abrasion Resistance

The surface of the hardcoat film was abraded with a #0000 steelwool which is applied a fixed load in a reciprocating manner 10 times (at a speed of 10 cm/sec). Plural loads were used in this test. The maximum load where the abrasion resistance was obtained, i.e., no scratches were produced, was recorded. The load of 2 kg/cm$^2$ is the practical level. The sample having no scratches at the load of 2 kg/cm$^2$ has good abrasion resistance.

(5) Pencil Hardness

Pencil hardness was measured by using the apparatus HEIDON (manufactured by Shinto Kagaku Co., Ltd.) in accordance with Japanese Industrial Standard K-5400. The sample having 2H or more has good pencil hardness.

(6) Surface Reflectance and Mean Ripple Amplitude

Reflectance of each sample was measured at an incidence angle of 10 degrees using U-3410 type spectrophotometer equipped with an integrating sphere having a diameter of 60 mm manufactured by Hitachi Ltd.

In order to avoid an effect of back surface reflection, the back surface of the sample was roughened using #240 sandpaper, and then colored with black Magic Ink (registered trademark) so that an average transmittance of visible rays at a wavelength of 400 to 600 nm was 5% or less. When the gloss (at incidence angle of 60° and at light-intercepting angle of 60°) of the back surface was 10 or less, there was no back surface effect. The gloss was measured using the Digital Variable Gloss Meter UGV-5B manufactured by Suga Test Instruments Co., Ltd. in accordance with JIS Z 8741.

Reflectance of each sample was measured at a wavelength within 400 to 600 nm, and plotted. In the plot, a crest line through crests (maximum values) in the ripple was drawn, and a root line through roots (minimum values) in the ripple was drawn. A difference value between the crest line and the root line was determined at sampling points, i.e., at 20 nm intervals. The sampling points are picked up where the wavelength equals to (400+20*i) nm, where i is an integer of 0 to 10. The average ripple amplitude was obtained by averaging the difference values at 11 points. Within the wavelength of 600 to 740 nm, the average ripple amplitude was also obtained similarly.

The mean difference value between the crest line and the root line at a wavelength of 550 nm was the surface reflectance. The samples having the surface reflectance of 6% or less passed the test. The samples having the mean ripple amplitude of 1% or less passed the test.

(7) Haze

The haze was measured using the Directly Reading Haze computer manufactured by Suga Test Instruments Co., Ltd. in accordance with JIS K-7105. The samples having the haze of 6% or less passed the test.

(8) Presence or Absence of Iris Pattern

In order to avoid an effect of back surface reflection, the back surface of each sample was roughened using #240 sandpaper, and then colored with black Magic Ink (registered trademark). In a dark room, each sample was placed directly under 30 cm apart from an inspection light source (National Palook, three-wave type daylight color, F.L 15EX-N 15 W, manufactured by Matsushita Electric Industrial Co., Ltd.), visually checked with different observer's eyes was the formation of iris pattern.

No visible iris pattern: A
Very weak iris pattern: B
Weak iris pattern: C
Strong and clear iris pattern: D (9) Clear View Property A photograph was placed under the hardcoat film. An image of the photograph was observed through the hardcoat film to determine whether or not the image was clearly visible.

Clearly visible: A
Not so clearly visible: B
Unclearly visible: C
Not visible: D

(10) Mountain-range-like Discontinuous Protrusion Observation

Each hardcoat film sample was allowed to stand under ordinary conditions (at 23° C., relative humidity of 65% RH) for 24 hours. The surface of the hardcoat film was abraded with a #0000 steelwool which was applied a load of 1 kg/cm$^2$ in a reciprocating manner 20 times (at a speed of 20 cm/sec). 100 cross cuts of 1 mm$^2$ were made on the hardcoat layer. A cellophane tape manufactured by Nichiban Co., Ltd. was adhered thereto. The rubber roller was pressed with a load of 19.6 N in a reciprocating manner 3 times over the tape. The cellophane tape was peeled away at an angle of 90° for several to several tens times. Then, the hardcoat layer was peeled away to leave a bare surface. Aluminum was vapor-deposited over the bare surface to be a sample. Mountain-range-like discontinuous protrusions at an interface of the substrate film and the hardcoat layer were observed using a differential interference microscope at 500 magnification. Lengths and widths of the protrusions within 200 μm×200 μm square area were read from a micrograph, and were averaged. Heights of the protrusions within 100 μm×100 μm square area were observed by a laser microscope (an ultra depth shape measuring microscope VK-8500, manufactured by Keyence Corp) at 1000 magnification to analyze the images, and were averaged.

2. Evaluation of Antireflection Film (1) Scratch Resistance, Steelwool Hardness

An antireflection surface of the antireflection film was abraded with a #0000 steelwool which was applied a load of 250 g load in a reciprocating manner 10 times with a stroke width of 10 cm and at a speed of 30 cm/sec. The surface was visibly observed to count the number of scratches and to evaluate in five scales: class 5: no scratches, class 4: 1 to 5 scratches, class 3: 6 to 10 scratches, class 2: 11 or more scratches, and class 1: many scratches over the entire surface.

(2) Haze

The haze was measured using the Directly Reading Haze computer manufactured by Suga Test Instruments Co., Ltd.

(3) Surface Resistivity (Antistatic Property)

The surface resistivity was measured using the HIRESTA manufactured by Mitsubishi Petrochem Co., Ltd.

(4) Reflectance

A measurement surface opposite to the antireflection layer was roughened uniformly using a #320 to 400 waterproof sandpaper such that the gloss at 60° (JIS Z 8741) is 10 or less. Then, the roughened surface was colored in black such that a transmittance of visible rays was 5% or less. The surface was measured for an absolute reflection spectrum using a spectrophotometer (UV-3150 manufactured by Shimadzu Corporation) at an incidence angle of 5 degrees. The absolute reflection spectrum at a wavelength within 380 to 800 nm, a reflectance at a wavelength of 400 nm, a reflectance at a wavelength of 700 nm, and a minimum reflectance at a wavelength within 400 to 700 nm were measured. When the reflection spectrum had ripples, respective reflectances were determined by the curve obtained by connecting middle points between crests (maximum points) and roots (minimum points).

(5) Maximum Ripple Amplitude

In the absolute reflection spectrum within the wavelengths of 400 to 700 nm, a perpendicular from a peak (maximum point A) of a crest to a line BC connecting opposite peaks (minimum points B, C) of adjacent roots was drawn. The perpendicular met the line BC at point D. The amplitude (%) was defined as a line AD. The maximum amplitude of the ripples was determined within a wavelength of 400 to 700 nm.

(6) Refractive Index

The refractive index was measured using the Abbe's refractometer in accordance with JIS K 7105.

(7) Surface Roughness

A surface shape of the film was observed using an atomic force microscope manufactured by Digital Instruments Inc. to determine a center line average surface roughness Ra and a maximum height Rmax.

The following examples further illustrate the present invention without intending to limit the present invention thereto.

<Preparation of Composition for Forming Hardcoat Layer>

<Coating Liquid A>

A coating liquid A was prepared by mixing 85 parts by weight of a mixture of a multifunctional acrylate containing no hydroxyl group: DPHA (dipentaerythritol hexaacrylate) and a multifunctional acrylate containing a hydroxyl group: DPPA (dipentaerythritol pentaacrylate) (KAYARAD (registered trademark) DPHA manufactured by NIPPON KAYAKU Co., Ltd., DPHA/DPPA weight ratio: 50/50), 5 parts by weight of polyester acrylate (M-7100 manufactured by Toagosei Co., Ltd.), and 10 parts by weight of polyisocyanate (Sumijule (registered trademark) N3300 manufactured by Sumika Bayer Urethane KK).

<Coating Liquid B>

A coating liquid B was prepared similar to the coating liquid A except that polyisocyanate was not added.

<Coating Liquid C>

A coating liquid C was prepared by dissolving the coating liquid A in a mixed solvent of toluene and methyl ethyl ketone at a weight ratio of 50/50 at a concentration of 60 percent by weight.

<Coating Liquid D>

A coating liquid D was prepared by mixing 85 parts by weight of KAYARAD (registered trademark) DPHA (manufactured by NIPPON KAYAKU Co., Ltd.), 5 parts by weight of polyester acrylate (M-7100 manufactured by Toagosei Co., Ltd.), and 10 parts by weight of polyisocyanate (Sumijule (registered trademark) I manufactured by Sumika Bayer Urethane KK).

<Coating Liquid E>

A coating liquid E was prepared by mixing 80 parts by weight of KAYARAD (registered trademark) DPHA (manufactured by NIPPON KAYAKU Co., Ltd.), 5 parts by weight of polyester acrylate (M-7100 manufactured by Toagosei Co., Ltd.), 10 parts by weight of polyisocyanate (Sumijule (registered trademark) I manufactured by Sumika Bayer Urethane KK), and 5 parts by weight of porous silica (Cylohobic (registered trademark) 100 (manufactured by Fuji Silysia Chemicla Co. Ltd.).

EXAMPLE 1

PET chips (limiting viscosity of 0.62 dl/g) containing 0.015 percent by weight of colloidal silica having a mean particle size of 0.4 μm and 0.005 percent by weight of colloidal silica having a mean particle size of 1.5 μm were fully dried at 180° C. under a vacuum, fed into an extruder, and melted at 285° C. and extruded through a T-shaped die to provide a sheet. The extruded sheet was wound around a mirror-finished cooling drum at a surface temperature of 20° C. using a static electricity-applying casting method, cooled and solidified to provide an undrawn sheet. The resultant undrawn sheet was drawn 3.0 times in the longitudinal direction with a group of rolls heated at 105° C. to provide an uniaxial film. The coating liquid A was coated over one surface of the uniaxially drawn film at a thickness of 20 μm. Clips grip both ends of the film to propel it through a preheating zone at 90° C. The film over which the coating liquid A was coated was further drawn 3.3 times in the width direction in a heating zone at 100° C. The film was relaxed 3% in the width direction, and heated in a heating zone at 230° C. for 17 seconds to cure and thermally fix the coating film. The resultant hardcoat film had a total thickness of 125 μm, the hardcoat layer of a thickness of 6 μm, and had excellent transparency. The results are shown in Table 1, which shows that the average ripple amplitude of 400 to 600 nm reflectance was 0.2%, the surface reflectance was 5.2%, the haze was 0.8%, the adhesion under ordinary conditions was A, the adhesion under wet heat conditions was A, the abrasion resistance was 3 kg/cm$^2$, the pencil hardness was 3H, the iris pattern was none, and the clear view property was A.

COMPARATIVE EXAMPLE 1

A hardcoat film was produced as in Example 1 except that the coating liquid B containing no polyisocyanate was used instead of the coating liquid A. The results are shown in Table 1, which shows that the average ripple was 1.7%, the surface reflectance was 5.2%, the haze was 0.8%, the adhesion under ordinary conditions was C, the adhesion under wet heat conditions was C, the abrasion resistance was 3 kg/cm$^2$, the pencil hardness was 3H, and the iris pattern existed.

COMPARATIVE EXAMPLE 2

An aqueous polyurethane resin was coated on a surface of a biaxial drawn PET film having a thickness of 150 μm that was cut in a size of A4 (the "Lumirror" (registered trademark) T-60 manufactured by Toray Industries, Inc.) such that a thickness after drying was 1 μm, and dried at 150° C. for 1 minute to form a primer layer. The coating liquid C was coated over the primer layer such that the final lamination thickness was 6 μm, and heated at 120° C. for 1 minute. Then, the film was fixed in a metal frame, and heated at 230° C. for 1 minute. The coated film was cured to provide a hardcoat film. Table 1 shows that the average ripple amplitude was 2.4%, the surface reflectance was 5.2%, the haze was 0.8%, the adhesion under ordinary conditions was good, the adhesion under wet heat conditions was not good, and the iris pattern existed.

COMPARATIVE EXAMPLE 3

A biaxial drawn PET film having a thickness of 150 μm that was cut in a size of A4 (the "Lumirror" (registered trademark) T-60 manufactured by Toray Industries, Inc. was used without forming the hardcoat layer. Table 1 shows that the average ripple amplitude was 0%, the surface reflectance was 7.2%, the haze was 0.8%, but the abrasion resistance and the pencil hardness were poor since no hardcoat layer was provided.

EXAMPLE 2

A hardcoat film was produced as in Example 1 except that the coating liquid D containing different polyisocyanate was used instead of the coating liquid A. The results are shown in Table 1, which shows that the average ripple was 0.2%, the surface reflectance was 5.2%, the haze was 0.8%, the adhesion under ordinary conditions was B, the adhesion under wet heat conditions was B, the abrasion resistance was 3 kg/cm$^2$, the pencil hardness was 3H, the iris pattern was none, and the clear view property was A.

EXAMPLE 3

A hardcoat film was produced as in Example 1 except that the coating liquid E was used instead of the coating liquid A. The results are shown in Table 1, which shows that the average ripple was 0.1%, the surface reflectance was 3.3%, the haze was 5.4%, the adhesion under ordinary conditions was A, the adhesion under wet heat conditions was A, the abrasion resistance was 3 kg/cm$^2$, the pencil hardness was 3H, the iris pattern was none, and the clear view property was B.

TABLE 1

| | Average ripple amplitude of reflectance, 400 to 600 nm (%) | Reflectance (%) | Haze (%) | Pencil hardness | Abrasion resistance (kg/cm$^2$) | Adhesion under ordinary conditions | Adhesion under wet heat conditions | Iris pattern | Clear view property | Average ripple amplitude of reflectance, 600 to 740 nm (%) | Mountain-range-like discontinuous protrusion (μm) | | |
|---|---|---|---|---|---|---|---|---|---|---|---|---|---|
| | | | | | | | | | | | Length | Width | Height |
| Ex. 1 | 0.2 | 5.2 | 0.8 | 3H | 3 | A | A | A | A | 0.5 | 21 | 1.2 | 0.2 |
| Comp. Ex. 1 | 1.7 | 5.2 | 0.8 | 3H | 3 | C | C | C | A | 2.8 | 4 | 0.2 | 0.03 |
| Comp. Ex. 2 | 2.4 | 5.2 | 0.8 | 3H | 3 | A | D | D | A | 4.2 | 0 | 0 | 0 |
| Comp. Ex. 3 | 0 | 7.2 | 0.8 | HB | 0.1 | — | — | A | A | — | — | — | — |
| Ex. 2 | 0.2 | 5.2 | 0.8 | 2H | 2 | B | B | A | A | 0.6 | 24 | 1.4 | 0.4 |
| Ex. 3 | 0.1 | 3.3 | 5.4 | 3H | 3 | A | A | A | B | 0.6 | 18 | 0.8 | 0.6 |

The compositions of the coating liquids were changed as shown in Table 2 below, and were evaluated.

TABLE 2

| Coating liquid | DPHA % by weight | DPPA % by weight | NVA % by weight | Polyisocyanate compound: product name/% by weight | Organic metal catalyst: product name/% by weight | NMP parts by weight |
|---|---|---|---|---|---|---|
| Coating liquid 1 | 44.6 | 39.6 | 4.9 | N3300/9.9 | XC-4205/1.0 | 99 |
| Coating liquid 2 | 44.6 | 39.6 | 4.9 | N3300/9.9 | XC-5218/1.0 | 99 |
| Coating liquid 3 | 44.6 | 39.6 | 4.9 | N3300/9.9 | XC-6212/1.0 | 99 |

TABLE 2-continued

| Coating liquid | DPHA % by weight | DPPA % by weight | NVA % by weight | Polyisocyanate compound: product name/% by weight | Organic metal catalyst: product name/% by weight | NMP parts by weight |
|---|---|---|---|---|---|---|
| Coating liquid 4 | 45 | 40 | 4.99 | N3300/10 | DBT/0.01 | 100 |
| Coating liquid 5 | 49.5 | 42.5 | 5 | N3300/2 | XC-4205/1.0 | 99 |
| Coating liquid 6 | 44.6 | 39.6 | 4.9 | N3200/9.9 | XC-4205/1.0 | 99 |
| Coating liquid 7 | 44.6 | 39.6 | 4.9 | N3300/9.9 | XC-4205/1.0 | 0 |
| Coating liquid 8 | 48.4 | 43 | 5.4 | N3300/2.1 | XC-4205/1.1 | 0 |
| Coating liquid 9 | 44.6 | 39.6 | 4.9 | N3300/9.9 | XC-5218/1.0 | 0 |
| Coating liquid 10 | 44.6 | 39.6 | 4.9 | N3300/9.9 | XC-6212/1.0 | 0 |
| Coating liquid 11 | 39.6 | 34.6 | 5 | N3300/19.8 | XC-4205/1.0 | 0 |
| Coating liquid 12 | 44.5 | 29.7 | 0 | N3300/24.8 | XC-4205/1.0 | 0 |
| Coating liquid 13 | 9.9 | 79.2 | 0 | N3300/9.9 | XC-4205/1.0 | 0 |
| Coating liquid 14 | 74.2 | 14.9 | 0 | N3300/9.9 | XC-4205/1.0 | 0 |
| Coating liquid 15 | 42 | 40 | 0 | N3300/10 | XC-4205/8 | 0 |
| Coating liquid 16 | 49.2 | 43.7 | 5.5 | N3300/0.5 | XC-4205/1.1 | 0 |

In Table 2, the parts by weight of the NMP was based on 100 parts by weight of all other additives, and the abbreviations used were as follows:

DPHA: dipentaerythritol hexaacrylate

DPPA: dipentaerythritol pentaacrylate

NVA: N-vinyl pyrolidone

NMP: N-methyl-2-pyrolidone

N3300: Sumijule (registered trademark) N3300 manufactured by Sumika Bayer Urethane KK mainly containing the compound represented by the chemical formula 4

N3200: Sumijule (registered trademark) N3200 manufactured by Sumika Bayer Urethane KK mainly containing the compound represented by the chemical formula 5

XC-4205: K-KAT XC-4205 zirconium-based catalyst (manufactured by King Industries Inc.)

XC-5218: K-KAT XC-5218 aluminum-based catalyst (manufactured by King Industries Inc.)

XC-6212: K-KAT XC-6212 zirconium-based catalyst (manufactured by King Industries Inc.)

DBT: dibuyl tine dilaurate

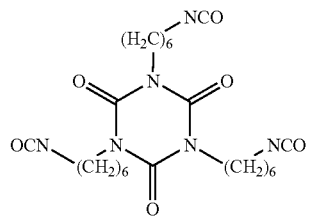

(chemical formula 4)

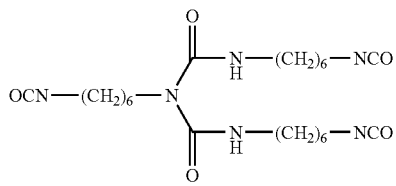

(chemical formula 5)

EXAMPLES 4 TO 18

In each example, PET chips (limiting viscosity of 0.63 dl/g) containing 0.015 percent by weight of colloidal silica having a mean particle size of 0.4 μm and 0.005 percent by weight of colloidal silica having a mean particle size of 1.5 μm were fully dried at 180° C. under a vacuum, fed into an extruder, and melted at 285° C. and extruded through a T-shaped multi-layer die to provide an undrawn sheet. The undrawn sheet was drawn 3.0 times in the longitudinal direction with a group of rolls heated at 100° C. to provide an uniaxial film. Each of the coating liquids 1 to 15 having the compositions shown in Table 2 was coated over one surface of the uniaxially drawn film at a thickness of 20 μm using a die-coating method. The types of the coating liquids used in respective examples are shown in Table 3. Clips grip both ends of the film to propel it through a preheating zone at 90° C. The film was further drawn 3.3 times in the width direction in a heating zone at 100° C. The film was relaxed 5% in the width direction, and heated in a heating zone at 220° C. for 12 seconds to complete the crystallization of the substrate film and to cure the hardcoat layer, whereby the hardcoat film having the hardcoat layer on the PET film was provided.

The resultant hardcoat film had a total thickness of 100 μm, the hardcoat layer of a thickness of 6 μm, and had excellent transparency. Each sample hardcoat film showed excellent abrasion resistance, adhesion, hardness and low average ripple amplitude, in spite of the fact that the hardcoat layer was formed by a relatively short heat treatment. The results are shown in Table 3.

COMPARATIVE EXAMPLE 4

A hardcoat film was produced as in Example 4 except that the coating liquid 16 was used instead of the coating liquid 1. The results are shown in Table 3. Since only a small amount of the polyisocyanate component was contained, the average ripple amplitude was great, the iris pattern existed, and the adhesion was poor.

ether ketone, and 38 parts by weight of isopropyl alcohol was agitated to provide a coating liquid for providing a coating film having a refractive index of 1.65.

C. Low Refractive Coating Liquid-1

219 parts by weight of methyl trimethoxysilane (Shin-Etsu Silicone, KBM-13) was agitated at 20±5° C., and hydrolyzed with 89 parts by weight of 0.5 N formic acid. After 60 minutes, 412 parts by weight of isopropyl alcohol was added and mixed thereto to prepare a treatment liquid (X1).

158 parts by weight of 3,3,3-trifluoro propyl trimethoxysilane (Shin-Etsu Silicone, KBM-7103) was agitated at 30±10° C., and hydrolyzed with 41 parts by weight of 0.5 N

TABLE 3

|  | Coating liquid | Adhesion under ordinary conditions | Adhesion under wet heat conditions | Abrasion adhesion | Abrasion resistance (kg) | Average ripple amplitude 400 to 600 nm | Average ripple amplitude 600 to 740 nm | Reflectance (%) | Haze (%) | Pencil hardness | Iris pattern | Clear view property |
|---|---|---|---|---|---|---|---|---|---|---|---|---|
| Ex. 4 | Coating liquid 1 | A | A | A | 3 | 0.7 | 1.8 | 5.4 | 0.8 | 3H | B | A |
| Ex. 5 | Coating liquid 2 | A | A | A | 3 | 0.7 | 1.7 | 5.2 | 0.8 | 3H | B | A |
| Ex. 6 | Coating liquid 3 | A | A | A | 3 | 0.7 | 1.8 | 5.2 | 0.8 | 3H | B | A |
| Ex. 7 | Coating liquid 4 | A | A | A | 3 | 0.8 | 1.8 | 5.3 | 0.8 | 3H | B | A |
| Ex. 8 | Coating liquid 5 | A | A | A | 4 | 0.9 | 2 | 5.1 | 0.8 | 3H | B | A |
| Ex. 9 | Coating liquid 6 | A | A | A | 3 | 0.7 | 1.8 | 5.3 | 0.8 | 3H | B | A |
| Ex. 10 | Coating liquid 7 | A | A | A | 3 | 0.3 | 0.8 | 5 | 0.8 | 3H | A | A |
| Ex. 11 | Coating liquid 8 | A | A | B | 4 | 0.9 | 1.8 | 5.2 | 0.8 | 3H | B | A |
| Ex. 12 | Coating liquid 9 | A | A | A | 3 | 0.3 | 0.7 | 5.2 | 0.8 | 3H | A | A |
| Ex. 13 | Coating liquid 10 | A | A | A | 3 | 0.3 | 0.7 | 5.1 | 0.8 | 3H | A | A |
| Ex. 14 | Coating liquid 11 | A | A | A | 3 | 0.2 | 0.5 | 5.2 | 0.8 | 3H | A | A |
| Ex. 15 | Coating liquid 12 | A | A | A | 3 | 0.2 | 0.5 | 5.3 | 0.8 | 3H | A | A |
| Ex. 16 | Coating liquid 13 | A | A | A | 3 | 0.3 | 0.7 | 5.2 | 0.8 | 3H | A | A |
| Ex. 17 | Coating liquid 14 | A | A | B | 4 | 0.3 | 0.7 | 5.3 | 0.8 | 3H | A | A |
| Ex. 18 | Coating liquid 15 | A | A | A | 4 | 0.4 | 0.8 | 5.3 | 0.8 | 3H | A | A |
| Comp. Ex. 4 | Coating liquid 16 | C | C | D | 3 | 1.3 | 2.4 | 5.5 | 0.8 | 3H | C | A |

The antireflection film of the present invention will be described by reference to its preferred embodiment.

[Preparation of Coating Liquid]

A. High Refractive Coating Liquid-1

A mixture of 6 parts by weight of ITO, 2 parts by weight of a multifunctional acrylate, 18 parts by weight of methanol, 54 parts by weight of polypropylene glycol monoethyl ether, and 20 parts by weight of isopropyl alcohol was agitated to provide a coating liquid for providing a coating film having a refractive index of 1.67.

B. High Refractive Coating Liquid-2

A mixture of 6 parts by weight of ATO, 2 parts by weight of a multifunctional acrylate, 54 parts by weight of methyl formic acid. After 60 minutes, 521 parts by weight of isopropyl alcohol was added and mixed thereto to prepare a treatment liquid (X2).

A silica slurry (X3) was prepared by mixing 144 parts by weight of porous silica particles (porosity of 40%) having a primary particle size of 50 nm and 560 parts by weight of isopropyl alcohol.

720 parts by weight of the treatment liquid (X1), 720 parts by weight of the treatment liquid (X2), 704 parts by weight of the silica slurry (X3), 356 parts by weight of methanol, 4272 parts by weight of isopropyl alcohol, and 713 parts by weight of polypropylene glycol monoethylether were agitated and mixed. As a curing catalyst, 15 parts by weight of acetacetoxy aluminum was added and agitated therein to prepare a coating liquid having a refractive index of 1.37.

D. Low Refractive Coating Liquid-2

50 parts by weight of the treatment liquid (X1) and 50 parts by weight of the treatment liquid (X2) were mixed at 80° C. for 1 hour to provide 100 parts by weight of an oligomer having a copolymerization ratio of 1:1 (X4).

720 parts by weight of the treatment liquid (X1), 720 parts by weight of the treatment liquid (X2), 704 parts by weight of the silica slurry (X3), 100 parts by weight of the oligomer (X4), 356 parts by weight of methanol, 4172 parts by weight of isopropyl alcohol, and 713 parts by weight of polypropylene glycol monoethylether were agitated and mixed. As a curing catalyst, 15 parts by weight of acetacetoxy aluminum was added and agitated therein to prepare a coating liquid having a refractive index of 1.36.

E. Low Refractive Coating Liquid-3

219 parts by weight of methyl trimethoxysilane, 158 parts by weight of 3,3,3-trifluoro propyl trimethoxysilane, 0.704 parts by weight of the silica slurry (X3), and 713 parts by weight of polypropylene glycol monoethylether were agitated and mixed. 1 part by weight of phosphoric acid and 130 parts by weight of water were added thereto, and agitated at 30±10° C., hydrolyzed for 60 minutes, agitated and polymerized at 80±5° C. for 60 minutes to provide an oligomer containing silica particles (X5).

1200 parts by weight of the oligomer containing silica particles (X5) and 5244 parts by weight of isopropyl alcohol were agitated and mixed. As a curing catalyst, 15 parts by weight of acetacetoxy aluminum was added and agitated therein to prepare a coating liquid having a refractive index of 1.35.

F. Low Refractive Coating Liquid-4

A coating liquid having a refractive index of 1.31 was prepared using the same conditions used in preparing the coating liquid E except that the porous silica particles had the porosity of 50%.

G. Low Refractive Coating Liquid-5

A coating liquid having a refractive index of 1.37 was prepared using the same conditions used in preparing the coating liquid E except that the porous silica particles had the porosity of 30%.

H. Low Refractive Coating Liquid-6

A coating liquid having a refractive index of 1.45 was prepared using the same conditions used in preparing the coating liquid G except that 14.4 parts by weight of the porous silica particles was used.

EXAMPLE 19

The high refractive coating liquid-1 was coated onto the hardcoat of the hardcoat film obtained in Example 1 using a microgravure coater, and dried at 80° C. The coating layer was irradiated with an ultraviolet rays at a dose of 1.0 J/cm$^2$ and cured to form a high refractive index layer having a thickness of about 0.1 µm. The low refractive index coating liquid-1 was coated onto the high refractive index layer, dried at 80° C., heated at 130° C., and cured to form a low refractive index layer having a thickness of about 0.1 µm, whereby an antireflection film was produced. As shown in FIG. 3, the resultant antireflection film had excellent properties: the minimum reflectance of 0.35% at the wavelength of 580 nm, the reflectance of 1.0% at the wavelength of 400 nm, the reflectance of 1.1% at the wavelength of 700 nm, the maximum ripple amplitude of 0.1% or less at the wavelength within 400 to 700 nm, had no interference fringes, and the scratch resistance of class 3.

EXAMPLES 20 TO 28

In each example, an antireflection film was produced using the same procedures in Example 19 except that the types of the high and low refractive index coating liquids were changed as shown in Table 4. The antireflection film had excellent properties, as shown in Table 4.

EXAMPLE 29

A commercially available hardcoat agent (Deso-light (registered trademark) Z7528 manufactured by JSR KK) was coated onto an adhesion promoting layer of a commercially available optical adhesion promoting polyester film (the "Lumirror" (registered trademark) QT63 manufactured by Toray Industries, Inc., having a thickness of 100 µm) using a microgravure coater, and dried at 80° C. The coating layer was irradiated with an ultraviolet rays at a dose of 1.0 J/cm$^2$ and cured to form a hardcoat layer having a thickness of 5 µm. A polyester substrate film had a refractive index of 1.66, the adhesion promoting layer had a refractive index of 1.58, and the hardcoat layer had a refractive index of 1.52. The equation (refractive index of the adhesion-promoting layer)={(refractive index of the substrate film)}×(refractive index of the hardcoat layer)}$^{1/2}$±0.02 was satisfied. An antireflection film was produced as in Example 19 except that this hardcoat film was used. The resultant antireflection film had excellent antireflection properties that the minimum reflectance was 0.1% or less at the wavelength of 570 nm, as shown in FIG. 4. Also, the antireflection film had the reflectance of 1.6% at the wavelength of 400 nm, the reflectance of 1.4% at the wavelength of 700 nm, the maximum ripple amplitude of about 0.1% at the wavelength within 400 to 700 nm, had almost no interference fringes, and had the scratch resistance of class 3.

EXAMPLES 30 TO 38

In each example, an antireflection film was produced using the same procedures in Example 29 except that the types of the high and low refractive index coating liquids were changed as shown in Table 4. The antireflection film had excellent properties, as shown in Table 4.

COMPARATIVE EXAMPLE 5

An antireflection film was produced as in Example 19 except that the low refractive index coating liquid-6 was used. The resultant antireflection film had the minimum reflectance of 1.5% at the wavelength of 590 nm, the reflectance of 4.3% at the wavelength of 400 nm, the reflectance of 2.6% at the wavelength of 700 nm, the maximum ripple amplitude of 0.1% or less at the wavelength within 400 to 700 nm, had no interference fringes, and had the scratch resistance of class 2. Thus, the antireflection film had poor reflectance and scratch resistance.

COMPARATIVE EXAMPLE 6

An antireflection film was produced as in Comparative Example 5 except that the film obtained in Comparative Example 2 was used. As shown in FIG. 2, the resultant antireflection film had the minimum reflectance of 1.2% at the wavelength of 590 nm, the reflectance of 4.0% at the wavelength of 400 nm, the reflectance of 2.4% at the wavelength of 700 nm, the maximum ripple amplitude of 0.8% or less at the wavelength within 400 to 700 nm, had distinct interference fringes, and had the scratch resistance of class 1. Thus, the antireflection film had interference fringes, and poor reflectance and scratch resistance.

TABLE 4

|  | High refractive index coating | Low refractive index coating | Reflectance (%) Minimum reflectance (wavelength) | Reflectance (%) 400 nm | Reflectance (%) 700 nm | Maximum ripple amplitude (%) | Scratch resistance | Haze (%) | Surface resistivity (Ω/square) | Surface roughness (nm) Ra | Surface roughness (nm) Rmax |
|---|---|---|---|---|---|---|---|---|---|---|---|
| Ex. 19 | 1 | 1 | 0.35 (580 nm) | 1.0 | 1.1 | <0.1 | class 3 | 1.25 | 1E9 | 12.2 | 111.3 |
| Ex. 20 | 1 | 2 | 0.36 (590 nm) | 1.1 | 1.1 | <0.1 | class 3 | 1.34 | 2E9 | 9.8 | 102.2 |
| Ex. 21 | 1 | 3 | 0.31 (600 nm) | 0.9 | 0.9 | <0.1 | class 4 | 1.07 | 9E8 | 3.3 | 79.4 |
| Ex. 22 | 1 | 4 | 0.26 (580 nm) | 0.9 | 0.8 | <0.1 | class 3 | 1.32 | 1E9 | 14.1 | 125.1 |
| Ex. 23 | 1 | 5 | 0.40 (580 nm) | 1.2 | 1.1 | <0.1 | class 4 | 1.45 | 1E9 | 5.4 | 77.4 |
| Ex. 24 | 2 | 1 | 0.38 (590 nm) | 0.9 | 0.9 | <0.1 | class 3 | 1.26 | 7E9 | 12.5 | 103.1 |
| Ex. 25 | 2 | 2 | 0.39 (570 nm) | 1.1 | 1.0 | <0.1 | class 3 | 1.34 | 8E9 | 10.2 | 114.9 |
| Ex. 26 | 2 | 3 | 0.33 (590 nm) | 0.9 | 0.9 | <0.1 | class 4 | 1.05 | 7E9 | 2.7 | 65.3 |
| Ex. 27 | 2 | 4 | 0.28 (600 nm) | 1.0 | 0.7 | <0.1 | class 3 | 1.33 | 1E10 | 13.8 | 112.0 |
| Ex. 28 | 2 | 5 | 0.44 (600 nm) | 1.3 | 1.2 | <0.1 | class 4 | 1.45 | 1E10 | 6.2 | 89.2 |
| Ex. 29 | 1 | 1 | <0.1 (570 nm) | 1.6 | 1.4 | 0.1 | class 3 | 0.99 | 1E9 | 12.7 | 113.1 |
| Ex. 30 | 1 | 2 | <0.1 (580 nm) | 1.7 | 1.3 | 0.1 | class 3 | 0.87 | 2E9 | 8.8 | 98.2 |
| Ex. 31 | 1 | 3 | <0.1 (590 nm) | 1.4 | 1.2 | 0.2 | class 4 | 0.63 | 1E9 | 3.1 | 70.1 |
| Ex. 32 | 1 | 4 | <0.1 (580 nm) | 1.6 | 1.3 | 0.1 | class 3 | 1.02 | 1E9 | 14.3 | 120.2 |
| Ex. 33 | 1 | 5 | <0.1 (600 nm) | 1.9 | 1.7 | 0.4 | class 4 | 0.75 | 2E9 | 6.5 | 90.1 |
| Ex. 34 | 2 | 1 | <0.1 (610 nm) | 1.6 | 0.6 | 0.2 | class 3 | 0.94 | 3E9 | 10.3 | 104.2 |
| Ex. 35 | 2 | 2 | <0.1 (600 nm) | 1.7 | 0.8 | 0.3 | class 3 | 0.83 | 4E9 | 8.6 | 94.1 |
| Ex. 36 | 2 | 3 | <0.1 (590 nm) | 1.3 | 1.2 | 0.1 | class 4 | 0.59 | 3E9 | 1.8 | 59.4 |
| Ex. 37 | 2 | 4 | <0.1 (590 nm) | 1.8 | 1.3 | 0.1 | class 3 | 0.98 | 5E9 | 11.3 | 95.9 |
| Ex. 38 | 2 | 5 | <0.1 (580 nm) | 2.0 | 1.4 | 0.3 | class 4 | 0.77 | 4E9 | 5.3 | 68.5 |
| Comp. Ex. 5 | 1 | 6 | 1.5 (590 nm) | 4.3 | 2.6 | <0.1 | class 2 | 1.52 | 1E10 | 1.1 | 20.6 |
| Comp. Ex. 6 | 1 | 6 | 1.2 (590 nm) | 4.0 | 2.4 | 0.8 | class 1 | 0.65 | 7E9 | 0.9 | 16.4 |

What is claimed is:

1. A hardcoat film comprising:
   a substrate film, and
   a hardcoat layer laminated on at least one side of the substrate film, said substrate film having discontinuous protrusions formed between the substrate film and the hardcoat layer amplitude of 1% or less.

2. A hardcoat film according to claim 1, wherein the hardcoat layer has a surface reflectance of 6% or less and a haze of 6% or less.

3. A hardcoat film according to claim 1, wherein the reflectance of the hardcoat layer at a wavelength within 600 to 740 nm has a mean ripple amplitude of 2% or less.

4. A hardcoat film according to claim 1, wherein the hardcoat layer is provided by a composition containing 10 to 80 percent by weight of a multi-functional acrylate compound including at least one hydroxyl group, 1 to 30 percent by weight of a polyisocyanate compound, and 0.001 to 10 percent by weight of an organic metal catalyst.

5. A hardcoat film according to claim 4, wherein the organic metal catalyst is selected from an organic tin compound, an organic aluminum compound and an organic compound containing a 4 group element.

6. A hardcoat film according to claim 4, wherein the polyisocyanate compound is an aliphatic polyisocyanate compound.

7. A hardcoat film according to claim 1, wherein the substrate film is a polyester film.

8. An antireflection film comprising:
   the hardcoat film to claim 1, and
   a high refractive index layer and a low refractive index layer sequentially laminated over the hardcoat layer,
   wherein the surface reflection spectrum at a wavelength within 400 to 700 nm satisfies all the following three conditions:
   (1) a minimum reflectance of 0.6% or less,
   (2) a reflectance at a wavelength of 400 nm of 3.5% or less, and
   (3) a reflectance at a wavelength of 700 nm of 3% or less.

9. An antireflection film according to claim 8, wherein the surface reflection spectrum at a wavelength within 400 to 700 nm has a maximum amplitude of 0.5% or less.

10. An antireflection film according to claim 8, wherein the surface reflection spectrum at a wavelength within 400 to 700 nm has a maximum amplitude of 0.2% or less.

11. An antireflection film according to claim 8, wherein the low refractive index layer has a refractive index of 1.42 or less, and the difference in refractive indices between the low refractive index layer and the high refractive index layer is 0.15 or more.

12. An antireflection film according to claim 8, wherein the low refractive index layer has a porosity of 5% or more.

13. An antireflection film according to claim 8, wherein the substrate film is at least one selected from polyester, acetate and an acrylic resin.

14. An equipment for display comprising the antireflection film of claim 8 adhered to a front side of a display panel or a transparent optical filter.

15. A hardcoat film comprising:
a substrate film comprising polyester, and
a hardcoat layer comprising an acrylic resin, laminated on at least one side of the substrate film,
wherein an adhesion-promoting layer comprising a water-dispersing polyester-based resin is disposed between the substrate film and the hardcoat layer; and the adhesion-promoting layer has a refractive index which satisfies the equation: (refractive index of the adhesion-promoting layer)={(refractive index of the substrate film)}×(refractive index of the hardcoat layer)}½+ 0.02; and
a reflectance of the hardcoat layer at a wavelength from 400 to 600 nm has a mean ripple amplitude of 1% or less.

16. An antireflection film comprising:
the hardcoat film of claim 15, and
a high refractive index layer and a low refractive index layer sequentially laminated over the hardcoat film,
wherein the surface reflection spectrum at a wavelength from 400 to 700 nm satisfies all the following conditions:
(1) a minimum reflectance of 0.6% or less,
(2) a reflectance at a wavelength of 400 nm of 3.5% or less, and
(3) a reflectance at a wavelength of 700 nm of 3% or less.

* * * * *